US011645433B2

(12) United States Patent
Krishnamurthy et al.

(10) Patent No.: US 11,645,433 B2
(45) Date of Patent: May 9, 2023

(54) COMPUTER SIMULATION OF PHYSICAL FLUIDS ON IRREGULAR SPATIAL GRIDS STABILIZED FOR EXPLICIT NUMERICAL DIFFUSION PROBLEMS

(71) Applicant: Dassault Systemes Simulia Corp., Johnston, RI (US)

(72) Inventors: Nagendra Krishnamurthy, Woburn, MA (US); Luca D'Alessio, Johnston, RI (US); Raoyang Zhang, Burlington, MA (US); Hudong Chen, Newton, MA (US)

(73) Assignee: Dassault Systemes Simulia Corp., Johnston, RI (US)

( * ) Notice: Subject to any disclaimer, the term of this patent is extended or adjusted under 35 U.S.C. 154(b) by 183 days.

(21) Appl. No.: 16/686,514

(22) Filed: Nov. 18, 2019

(65) Prior Publication Data
US 2020/0394277 A1 Dec. 17, 2020

Related U.S. Application Data

(60) Provisional application No. 62/859,751, filed on Jun. 11, 2019.

(51) Int. Cl.
*G06F 30/20* (2020.01)
*G06F 111/10* (2020.01)

(52) U.S. Cl.
CPC .......... *G06F 30/20* (2020.01); *G06F 2111/10* (2020.01)

(58) Field of Classification Search
None
See application file for complete search history.

(56) References Cited

U.S. PATENT DOCUMENTS

| 5,594,671 A | 1/1997 | Chen et al. |
| 5,910,902 A | 6/1999 | Molvig et al. |
| 7,542,885 B1 | 6/2009 | Majumdar |
| 2010/0169062 A1 | 7/2010 | Linn et al. |

(Continued)

OTHER PUBLICATIONS

Zarghami, A., Mohammad Javad Maghrebi, J. Ghasemi, and S. Ubertini. "Lattice Boltzmann finite volume formulation with improved stability." Communications in Computational Physics 12, No. 1 (2012): 42-64 (Year: 2012).*

(Continued)

*Primary Examiner* — Andre Pierre Louis
(74) *Attorney, Agent, or Firm* — Fish & Richardson P.C.

(57) ABSTRACT

Computer implemented techniques for simulating a fluid flow about a surface of a solid are disclosed. These techniques involve receiving a model of a simulation space including a lattice structure represented as a collection of voxels and a representation of a physical object, with the voxels having appropriate resolutions to account for surfaces of the physical object. The techniques also involve simulating movement of particles in a volume of fluid, with the movement of the particles causing collisions among the particles, identifying faces between two voxels where at least one of the faces violates a stability condition, computing a modified flux using a spatially averaged gradient in the vicinity of the two voxels where the at least one of the faces violates the stability condition, and performing by the computing system, advection operations on the particles to subsequent voxels.

20 Claims, 10 Drawing Sheets

(56) References Cited

U.S. PATENT DOCUMENTS

| | | | |
|---|---|---|---|
| 2010/0250205 A1 | 9/2010 | Velazquez Lopez et al. | |
| 2011/0268147 A1 | 11/2011 | Bornoff et al. | |
| 2011/0289043 A1 | 11/2011 | Suresh et al. | |
| 2013/0151221 A1 | 6/2013 | Chen et al. | |
| 2013/0246024 A1 | 9/2013 | Rodriguez et al. | |
| 2014/0136159 A1 | 5/2014 | Chen et al. | |
| 2015/0356217 A1* | 12/2015 | Chen | G06F 17/18 703/2 |
| 2016/0188768 A1 | 6/2016 | Gopalakrishnan et al. | |
| 2016/0321384 A1 | 11/2016 | Pal et al. | |
| 2020/0050715 A1* | 2/2020 | Krishnamurthy | G06F 17/10 |
| 2020/0210539 A1 | 7/2020 | Chen et al. | |

OTHER PUBLICATIONS

Chen, Hudong. "Volumetric formulation of the lattice Boltzmann method for fluid dynamics: Basic concept." Physical Review E 58, No. 3 (1998): 3955-3963 (Year: 1998).*

Imamura, Taro, Kojiro Suzuki, Takashi Nakamura, and Masahiro Yoshida. "Acceleration of steady-state lattice Boltzmann simulations on non-uniform mesh using local time step method." Journal of Computational Physics 202, No. 2 (2005): 645-663 (Year: 2005).*

Zhang, Raoyang, Hudong Chen, Yue Hong Qian, and Shiyi Chen. "Effective volumetric lattice Boltzmann scheme." Physical review E 63, No. 5 (2001): 056705, 6 pages (Year: 2001).*

McNamara, Guy R Alejandro L. Garcia, and Berni J. Alder. "Stabilization of thermal lattice Boltzmann models." Journal of Statistical Physics 81, No. 1 (1995): 395-408 (Year: 1995).*

Bardow, André, Iliya V. Karlin, and Andrei A. Gusev. "General characteristic-based algorithm for off-lattice Boltzmann simulations." EPL (Europhysics Letters) 75, No. 3 (2006): 434 (Year: 2006).*

Ambrus et al., "High-order quadrature-based lattice Boltzmann models for the f low of ultrarelativistic rarefied gases," Phys. Rev., Sep. 2018, 98:035201.

Bo et al., "Numerical simulation of thermal flow of power-law fluids using lattice Boltzmann method on non-orthogonal grids", International J. of Heat and Mass Transfer, May 2018, 126:293-305.

Extended European Search Report in EP Appln. No. 20179651.3, dated Nov. 5, 2020, 12 pages.

Extended European Search Report in EP Appln. No. 19218794.6, dated May 12, 2020, 6 pages.

Guo and Zhao, "Explicit finite-difference lattice Boltzmann method for curvilinear coordinates," Phys. Rev. E., 2003, 67(6):066709, 12 pages.

McNamara et al., "Stabilization of thermal lattice Boltzmann models. Journal of Statistical Physics," Oct. 1, 1995, 81(1-2):395-408.

* cited by examiner

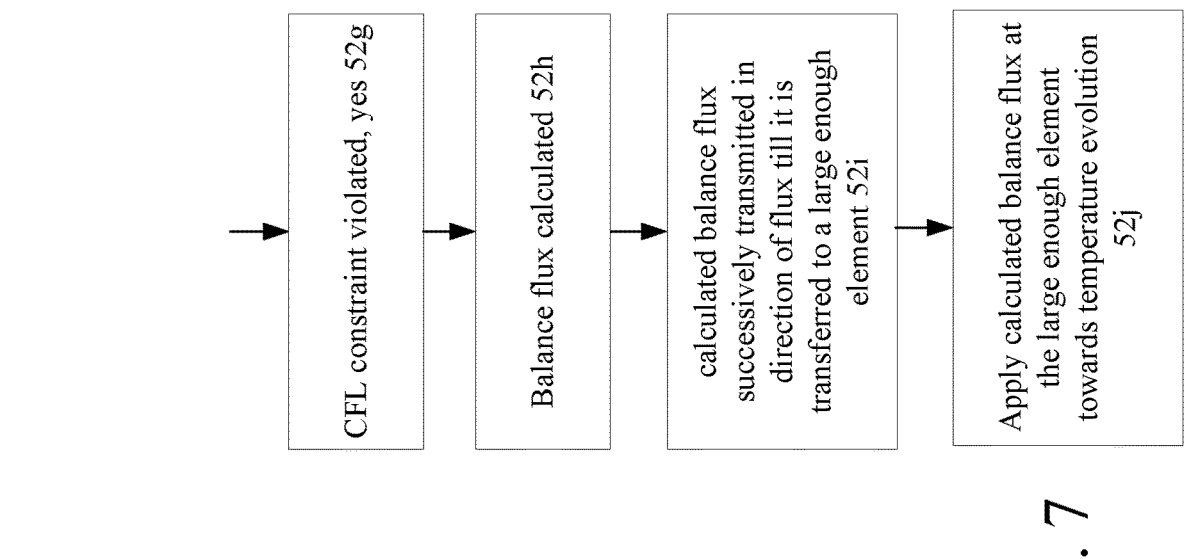
FIG. 6
FIG. 7
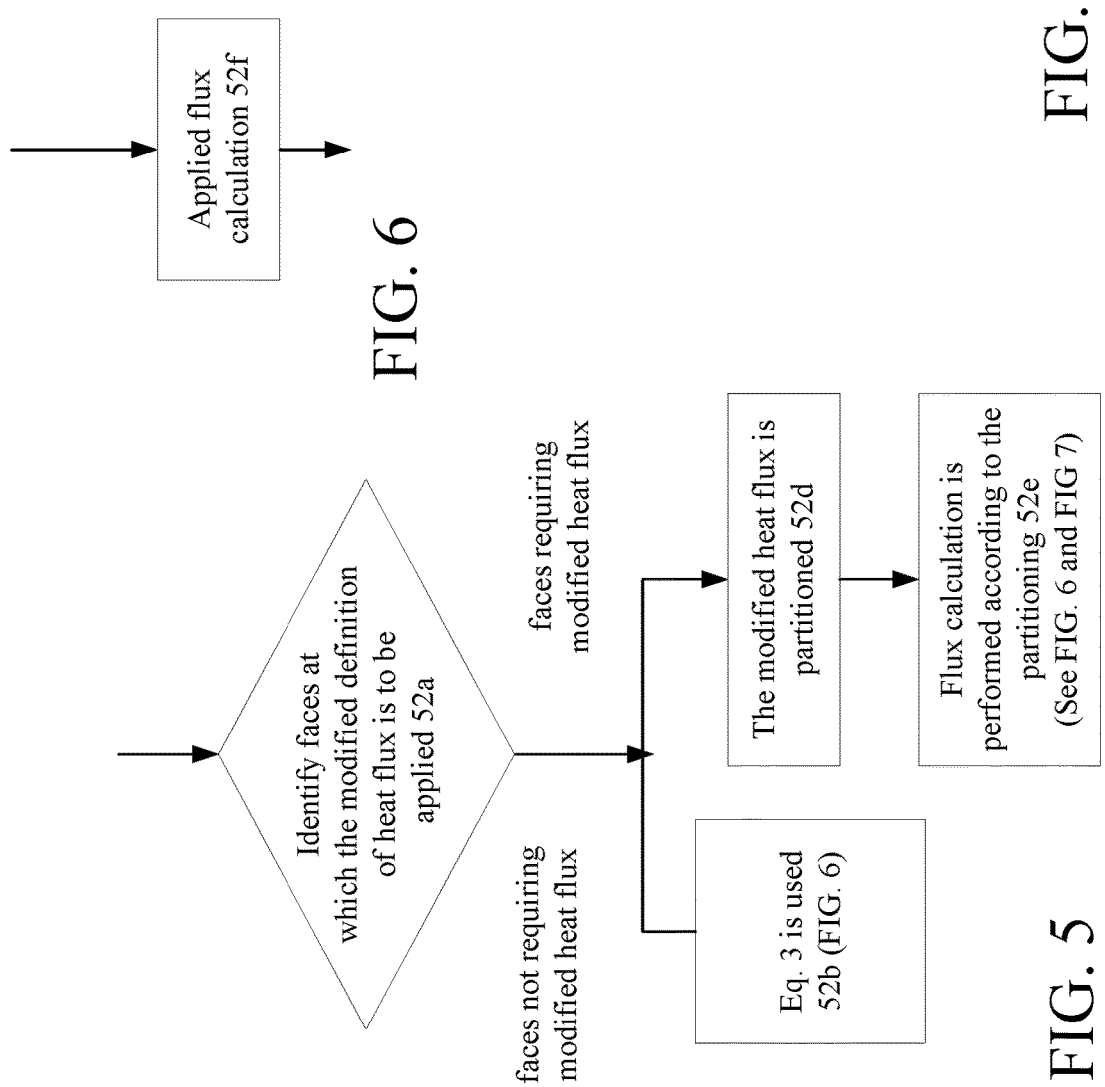
FIG. 5

COMPUTER SIMULATION OF PHYSICAL FLUIDS ON IRREGULAR SPATIAL GRIDS STABILIZED FOR EXPLICIT NUMERICAL DIFFUSION PROBLEMS

CLAIM OF PRIORITY

This application claims priority under 35 USC § 119(e) to U.S. Provisional Patent Application Ser. No. 62/859,751, filed on Jun. 11, 2019, and entitled "COMPUTER SIMULATION OF PHYSICAL FLUIDS ON IRREGULAR SPATIAL GRIDS WITH STABILIZE EXPLICIT NUMERICAL DIFFUSION PROBLEMS," the entire contents of which are hereby incorporated by reference.

BACKGROUND

This description relates to computer simulation of physical processes, such as physical fluid flows.

Computational fluid dynamics is a branch of fluid mechanics involving computer implemented numerical analysis techniques to analyze and simulate fluid flows in physical environments.

One technique is the so called "Lattice Boltzmann Method" (LBM). The Lattice Boltzmann Method is an advantageous technique for use in computational fluid dynamics. The underlying dynamics of a lattice Boltzmann system resides in the fundamental physics of kinetic theory that involves motion of many particles according to the Boltzmann equation. There are two fundamental dynamical processes in a basic Boltzmann kinetic system—collision and advection. The collision process involves interactions among particles obeying conservation laws and relaxing to an equilibrium state. The advection process involves modeling movement of particles from one location to another according to the particles microscopic velocities.

Numerical simulation of diffusion-dominated physical phenomena is commonly used for applications involving conductive heat transfer, mass diffusion, electrical conduction, etc. The governing equations for these phenomena are formulated as a set of partial differential equations (PDEs) that include unsteady (unstable) diffusion and volumetric source terms. Numerical solutions involve discretizing the spatial domain of interest and applying time-integration techniques to advance the solution in time. The spatial discretization is usually accomplished using automated grid generation tools, whereas temporal discretization (for applying time-integration techniques to advance the solution in time, i.e., time-step size) is chosen to ensure stability and accuracy of the numerical solution at an acceptable computational cost.

One common aspect found in practical computational fluid dynamic simulation problems, including the "Lattice Boltzmann Method" (LBM), is to ensure both stability and accuracy of the results of such fluid simulations, especially when the fluid simulations involve complex geometries, e.g., irregular grids for surface and volume discretization.

In particular, the stability characteristic commonly referred to as the Courant-Friedrichs-Lewy (CFL) constraint of the time advancing scheme determines the largest time-step size that can be used without introducing significant instability to the solution. Two types of time-marching schemes are commonly employed—implicit and explicit.

Implicit methods satisfy the CFL constraint by construction, and hence large time-steps can be used without making the solution unstable (however too large time-steps generally lead to inaccurate results). Implicit methods require the solution of a large system of matrix coefficients, thus making their practical implementation both non-trivial and computationally expensive.

Explicit methods, on the other hand, are simple to implement, computationally inexpensive (per iteration) and highly parallelizable, relative to implicit methods. Explicit methods as with implicit methods need to satisfy the CFL constraint. The CFL constraint for explicit diffusion scheme dictates that the CFL number given by $(\kappa \Delta\_t)/(\Delta\_x^2)$ is less than a certain limit (which is O(1)), where $\kappa$ is the diffusivity, $\Delta\_x$ is the size of the smallest spatial grid and $\Delta\_t$ is the time-step. In other words, if the spatial grid size $\Delta\_x$ decreases anywhere in the domain by a factor F, the time-step $\Delta\_t$ will have to decrease by a factor $F^2$ in order to maintain numerical stability.

Therefore, explicit methods can require extremely small time-steps for spatial grids with small sized elements. This requirement can severely affect simulation performance, e.g., computation efficiency (computation resources and computation time). This effect on computation efficiency is present even if the number of such small sized elements is very limited in the simulation domain because the smallest element in the entire domain determines the CFL condition and hence the time-step size.

As a result, explicit scheme approaches attempt to address this requirement by trying to improve the quality of spatial grids, to alleviate this time-step problem.

SUMMARY

According to an aspect, a computer implemented method for simulating a fluid flow about a surface of a solid includes receiving by one or more computing systems, a model of a simulation space including a lattice structure represented as a collection of voxels and a representation of a physical object, with the voxels having appropriate resolutions to account for surfaces of the physical object, simulating, by the one or more computer systems, movement of particles in a volume of fluid, with the movement of the particles causing collisions among the particles, identifying by the computing system, faces between two voxels where at least one of the faces violates a stability condition, computing by the computing system, a modified flux using a spatially averaged gradient in the vicinity of the two voxels where the at least one of the faces violates the stability condition, and performing by the computing system, advection operations on the particles to subsequent voxels.

Aspects include methods, computer program products, one or more machine-readable hardware storage devices, apparatuses and computing systems.

One or more of the above aspects may include amongst features described herein one or more of the following features.

The computed modified flux is a computed modified heat flux and the spatially averaged gradient is a spatially averaged temperature gradient. Computing the modified heat flux further includes an applied flux; and computing a balance flux. For a given one of the voxels, the computed applied flux is used to calculate a temperature evolution for the given one of the voxels. The balance flux is used in the calculation of the temperature evolution depending on the size of the voxel. The balance flux is used in the temperature evolution when the size of the voxel is large enough to as to satisfy the constraint. The aspect further includes transmitting by the computer system the balance flux to one or more neighboring voxels in a direction of the flux.

One or more of the above aspects may include one or more of the following advantages.

The disclosed techniques introduce modifications to heat flux calculations between two neighboring elements when at least one of the elements violates a constraint, e.g., the Courant-Friedrichs-Lewy (CFL) constraint. These modifications to heat flux calculations are dependent on the material and geometric properties of the two elements as well as the existing state of quantity of interest in the immediate vicinity of the elements, and help stabilize the numerical solution irrespective of the size of the two elements and ensure spatio-temporal accuracy. When the two neighboring elements are large (and therefore satisfy the CFL constraint) the new proposed flux calculation reduces to an explicit scheme implementation implying that this novel approach is consistent with the explicit approach, and yet overcomes the above mentioned deficiencies in the explicit approach.

By recognizing the advantages and disadvantages of each of the two types of time-marching schemes—implicit and explicit—schemes, the disclosed approach provides a computationally efficient solution that satisfies the CFL constraint, while recognizing that the CFL constraint for explicit diffusion schemes dictate that the CFL number given by $(\kappa \Delta\_t)/(\Delta\_x^2)$ is less than a certain limit (which is $O(1)$), where $\kappa$ is the diffusivity, $\Delta\_x$ is the size of the smallest spatial grid and $\Delta\_t$ is the time-step. In other words, if the spatial grid size $\Delta\_x$ decreases anywhere in the domain by a factor F, the time-step $\Delta\_t$ will have to decrease by a factor $F^2$ in order to maintain numerical stability. The disclosed approach avoids the need for extremely small time-steps for spatial grids with small sized elements that would otherwise severely affect simulation computational performance.

Other features and advantages will be apparent from the following description, including the drawings, and the claims.

BRIEF DESCRIPTION OF THE DRAWINGS

FIGS. 3-7 depicts show flow diagrams involving aspects of modifications to heat flux calculations between two neighboring elements when at least one of the elements violates a constraint.

DESCRIPTION

Model Simulation Space

Figure 1:
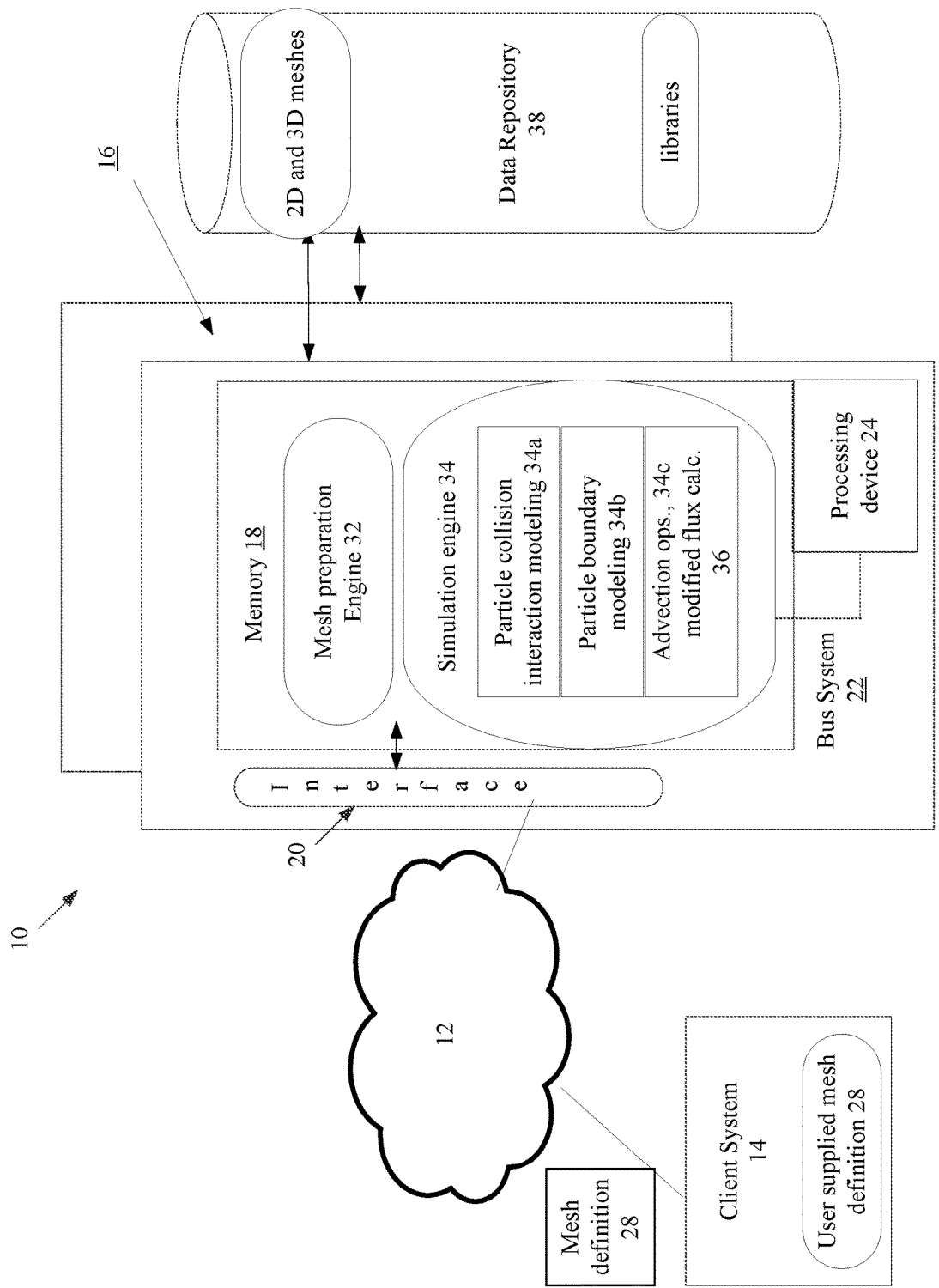
FIG. 1 depicts a system for simulation of fluid flows.

In a LBM-based physical process simulation system, fluid flow is represented by the distribution function values $f_i$, evaluated at a set of discrete velocities $c_i$. The dynamics of the distribution function is governed by Equation I.1, $$f_i(x+c_i,t+1)=f_i(x,t)+C_i(x,t) \qquad \text{Eq. (I.1)}$$

This equation is the well-known lattice Boltzmann equation that describes the time-evolution of the distribution function, $f_i$. The left-hand side represents the change of the distribution due to the so-called "streaming process." The streaming process is when a pocket of fluid starts out at a mesh location, and then moves along one of plural velocity vectors to the next mesh location. At that point, the "collision factor," i.e., the effect of nearby pockets of fluid on the starting pocket of fluid, is calculated. The fluid can only move to another mesh location, so the proper choice of the velocity vectors is necessary so that all the components of all velocities are multiples of a common speed.

The right-hand side of the first equation is the aforementioned "collision operator" which represents the change of the distribution function due to the collisions among the pockets of fluids. The particular form of the collision operator can be, but not limited to, of the Bhatnagar, Gross and Krook (BGK) operator. The collision operator forces the distribution function to go to the prescribed values given by the second equation, which is the "equilibrium" form, $$f_i^{eq} = \rho \omega_i \left[ 1 + \frac{c_i^\alpha u^\alpha}{T_0} + \frac{1}{2T_0}\left(\frac{c_i^\alpha c_j^\beta}{T_0} - \delta^{\alpha\beta}\right)u^\alpha u^\beta \right] \qquad \text{Eq. (I.2)}$$

The BGK operator is constructed according to the physical argument that, no matter what the details of the collisions, the distribution function approaches a well-defined local equilibrium given by $\{f^{eq}(x, v, t)\}$ via collisions:

$$C = -\frac{1}{\tau}(f - f^{eq}),$$

where the parameter $\tau$ represents a characteristic relaxation time to equilibrium via collisions.

From this simulation, conventional fluid variables, such as mass $\rho$ and fluid velocity u, are obtained as simple summations in Eq.(I.3) see below.

Due to symmetry considerations, the set of velocity values are selected in such a way that they form certain lattice structures when spanned in the configuration space. The dynamics of such discrete systems obeys the LBM equation having the form $$f_i(x+c_i,t+1)=f_i(x,t)+C_i(x,t)$$

where the collision operator usually takes the BGK form, as described above. By proper choices of the equilibrium distribution forms, it can be theoretically shown that the lattice Boltzmann equation gives rise to correct hydrodynamic and thermo-hydrodynamic results. That is, the hydrodynamic moments derived from $f_i(x, t)$ obey the Navier-Stokes equations in the macroscopic limit. These moments are defined as:

$$\rho(x,t)=\Sigma_i f_i(x,t); \rho(x,t)u(x,t)=\Sigma_i c_i f_i(x,t) \qquad \text{Eq.(I.3)}$$

where ρ and u are, respectively, the fluid density and velocity.

The collective values of $c_i$ and $w_i$ define a LBM model. The LBM model can be implemented efficiently on scalable computer platforms and run with great robustness for time unsteady flows and complex boundary conditions.

A standard technique of obtaining the macroscopic equation of motion for a fluid system from the Boltzmann equation is the Chapman-Enskog method in which successive approximations of the full Boltzmann equation are taken. In a fluid system, a small disturbance of the density travels at the speed of sound. In a gas system, the speed of the sound is generally determined by the temperature. The importance of the effect of compressibility in a flow is measured by the ratio of the characteristic velocity and the sound speed, which is known as the Mach number.

For a further explanation of conventional LBM-based physical process simulation systems the reading is referred to US Patent Publication US-2016-0188768-A1, the entire contents of which are incorporated herein by reference.

Referring to FIG. 1, a system 10 for simulating a fluid flow, e.g., about a representation of a physical object is shown. The system 10 in this implementation is based on a client-server architecture and includes a server system 12 implemented as a massively parallel computing system 12 and a client system 14. The server system 12 includes memory 18, a bus system 11, interfaces 20 (e.g., user interfaces/network interfaces/display or monitor interfaces, etc.) and a processing device 24 that together with a mesh and simulation engine 34 provide a simulation process 30.

FIG. 1 shows a mesh preparation engine 32 and a simulation engine 34 in memory 18. While FIG. 1 shows the mesh preparation engine 32 in memory 18, the mesh preparation engine can be a third party application that is executed on a different system (e.g., system 14 or another system) than server 12. Whether the mesh preparation engine 32 executes in memory 18 or is executed on a different system than server 12, the mesh preparation engine 32 receives a user-supplied mesh definition 28 and the mesh preparation engine 32 prepares a mesh and sends the prepared mesh to the simulation engine 34.

The simulation engine 34 includes a particle collision interaction module 34a, a particle boundary model module 34b and advection module 34c that performs advection operations. The system 10 accesses a data repository 38 that stores 2D and/or 3D meshes and libraries. The advection module 34c includes a submodule 36 that performs advection operations according to a modification of a flux calculation between two neighboring elements, as discussed below.

Prior to execution of a simulation in the simulation engine, a simulation space is modeled as a collection of voxels. Typically, the simulation space is generated using a computer-aided-design (CAD) program. For example, a CAD program could be used to draw an micro-device positioned in a wind tunnel. Thereafter, data produced by the CAD program is processed to add a lattice structure having appropriate resolution and to account for objects and surfaces within the simulation space.

Figure 2:
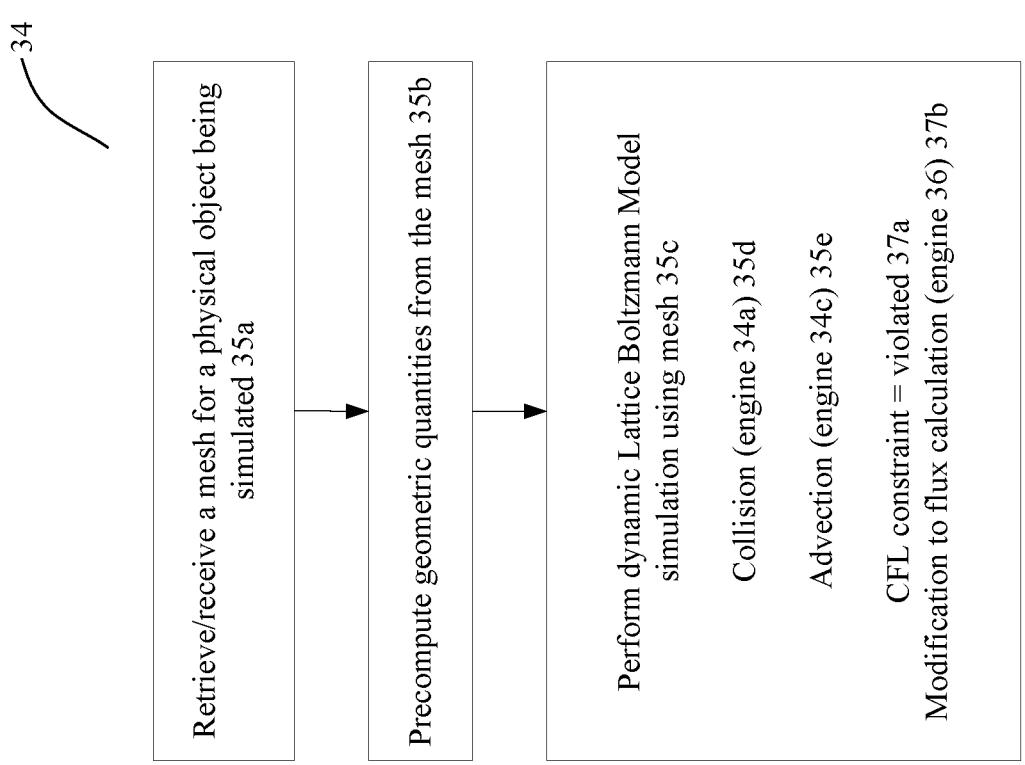
FIG. 2 depicts a flow chart showing simulation operations based on a Lattice Boltzmann Model with to heat flux calculations.

Referring now to FIG. 2, a process for simulating fluid flow about a representation of a physical object is shown. In the example that will be discussed herein, the physical object is an airfoil. The use of an airfoil is merely illustrative however, as the physical object can be of any shape, and in particular can have planar and/or curved surface(s). The process receives 35a, e.g., from client system 14 or by retrieval from the data repository, a mesh for the physical object being simulated. In other embodiments, either an external system or the server 12 based on user input, generates the mesh for the physical object being simulated. The process precomputes 35b geometric quantities from the retrieved mesh and performs 35c dynamic Lattice Boltzmann Model simulation using the precomputed geometric quantities corresponding to the retrieved mesh. Lattice Boltzmann Model simulation includes the simulation of evolution 35d of particle distribution 34a and advection 35e of particles to a next cell $\bar{q}$ in a LBM mesh according to boundary determinations (not shown in FIG. 2) produced from engine 34b (FIG. 1). The advection 35c process tests for a CFL constraint violation 37a and if found applies a modification to a flux calculation 37b using engine 36 (FIG. 1).

Stabilizing Explicit Numerical Schemes for Diffusion Problems on Irregular Spatial Grids For the purpose of this description, the explicit Euler scheme and a finite volume formulation are assumed. In the following description, the quantity of interest is temperature and the governing equation is the heat conduction equation. The numerical scheme requires the heat fluxes at all faces of an element to be computed. Subsequently, these fluxes are summed up and used to update the temperature of the element under consideration.

Consider two faces sharing neighboring elements α and β: according to the Fourier's law of thermal conduction the heat flux is:

$$q_m^{\beta \to \alpha} = k_m^{\alpha\beta} \frac{\partial T}{\partial n}\bigg|_m^{\alpha\beta} \quad \text{(Eq. 1)}$$

where $k_m^{\alpha\beta}$ is the thermal conductivity at the common face $$\frac{\partial T}{\partial n}\bigg|_m^{\alpha\beta}$$

is the temperature gradient normal to the common face and "m" is used to specify that the quantities are evaluated at time-step "m". The negative sign in the commonly used form of Fourier's law is dropped out since heat entering α is considered (instead of heat leaving α). The temperature gradient used is computed to ensure smoothness of particle advection, especially in the presence of different sized elements. If the two neighboring elements α and β satisfy the CFL constraint the energy transfer across the common face during a time-step m to m+1 is obtained by multiplying the heat flux by the area of the common face, $A^{\alpha\beta}$, and the time-step size, $\Delta_t$, i.e.

$$Q_m^{\beta \to \alpha} = q_m^{\beta \to \alpha} A^{\alpha\beta} \Delta_t \quad \text{(Eq. 2)}$$

In the traditional approach, the final temperature of element α at the end of the time-step is computed from the net energy transfer to α (sum of energy transfers from all faces):

$$T_{m+1}^\alpha = T_m^\alpha + \frac{1}{\rho_m^\alpha C_{p_m}^\alpha \forall^\alpha} \sum_i q_m^{\beta_i \to \alpha} A^{\alpha\beta} \Delta_t \quad \text{(Eq. 3)}$$

Note that equation (3) above states that the temperature change is proportional to the net heat flux and inversely proportional to the size of the element $\forall^\alpha$, i.e. for small elements the same net energy transfer results in larger temperature changes.

Figure 3:
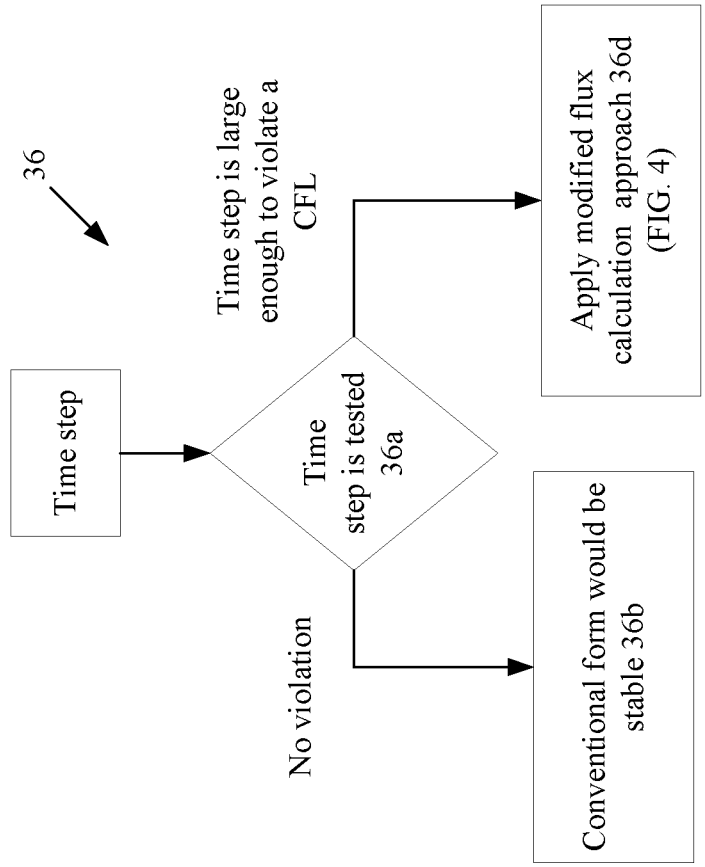

Referring to FIG. 3, the flux modification calculation process 36 includes a determination of time-step. In the flux calculation process 36, a time-step value $\Delta_t$ is tested 36a. When the time-step $\Delta_t$ is not large enough to violate 36b the CFL constraint for the two elements, the above form (Eq. 3) will not likely lead to numerical instability in the solution and thus the above conventional form (Eq. 3) of the flux calculation is used 36b.

However, when the time-step $\Delta_t$ is large enough to violate the CFL constraint for at least one of the two elements, the above form (Eq. 3) could lead to numerical instability in the solution. In this instance, a modified flux calculation approach 36c is applied. Without loss of generality, the modified approach can be explained as follows:

Assume that the element $\alpha$ is smaller than the neighboring element $\beta$ and therefore the CFL constraint is violated for at least element $\alpha$. This numerical instability arises because, for element $\alpha$ (which is assumed to be small in size), it would be incorrect to assume that the temperature gradients used to compute $q_m^{\beta_i \to \alpha}$ remain at a constant value throughout the duration of the time-step $\Delta_t$. As noted above, for the same net energy transfer the temperature change of small elements is larger, and hence standard explicit time integration requires that time-step be reduced to ensure that constant temperature gradient assumption is valid. For the given $\Delta_t$, this issue persists as long as unsteadiness in the problem exists, and goes away only at steady state when all the incoming and outgoing fluxes on every element balance each other out exactly.

Figure 4:
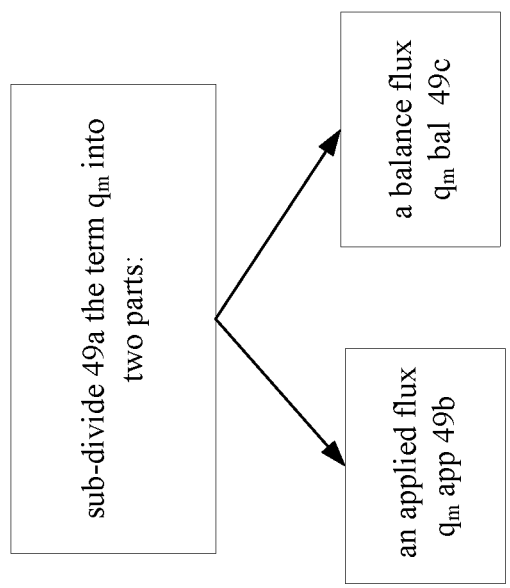

Referring to FIG. 4, as part of the modified approach, the flux modified flux calculation sub-divides 49a the term $q_m^{\beta \to \alpha}$ as defined in equation (1) into two parts: part (1a) is an applied flux $q_{m_{app}}^{\beta \to \alpha}$ term 49b that is used towards temperature evolution (in the summation above) of $\alpha$, and part (1b) is a balance flux $q_{m_{bal}}^{\beta \to \alpha}$ term 49c that is transmitted to the other side of the spatial interface $\alpha\beta$ without changing temperature of element $\alpha$, and which is expressed as follows:

$$q_{m_{app}}^{\beta \to \alpha} = q_m^{\beta \to \alpha} \left[ \frac{1 - \exp(-C_m^{\alpha\beta}\Delta_t)}{C_m^{\alpha\beta}\Delta_t} \right] + \Delta G \left[ \frac{1 - \exp(-C_m^{\alpha\beta}\Delta_t)}{(C_m^{\alpha\beta}\Delta_t)^2} - \frac{1}{C_m^{\alpha\beta}\Delta_t} \right] \quad (4)$$

where, the terms $C_m^{\alpha\beta}$ and $\Delta G$ are given by:

$$C_m^{\alpha\beta} = \frac{k_m^{\alpha\beta} A^{\alpha\beta}}{d^{\alpha\beta}} \left( \frac{1}{\rho_m^\alpha C_{p_m}^\alpha \forall^\alpha} + \frac{1}{\rho_m^\beta C_{p_m}^\beta \forall^\beta} \right) \quad (5)$$

$$\Delta G = \frac{k_m^{\alpha\beta}}{d^{\alpha\beta}} \left( \frac{\Sigma_{\gamma \ne \beta} q_{OLD}^{\gamma \to \alpha} A^{\alpha\gamma}}{\rho_m^\alpha C_{p_m}^\alpha \forall^\alpha} + \frac{\Sigma_{\gamma \ne \alpha} q_{OLD}^{\gamma \to \beta} A^{\beta\gamma}}{\rho_m^\beta C_{p_m}^\beta \forall^\beta} \right) \quad (6)$$

and, $$q_{m_{bal}}^{\beta \to \alpha} = q_m^{\beta \to \alpha} - q_{m_{app}}^{\beta \to \alpha} \quad (7)$$

In the above equations, the geometric features are represented by $d^{\alpha\beta}$, the distance used in calculation of the temperature gradient, $\forall^\alpha$ and $\forall^\beta$, the element volumes and $A^{\alpha\beta}$, the area of the common face (shared by neighboring elements). The material properties are accounted for by $\rho_m^\alpha C_{p_m}^\alpha$ and $\rho_m^\beta C_{p_m}^\beta$ (here $\rho$ indicates the density and $C_p$ the specific heat) and $k_m^{\alpha\beta}$, the thermal conductivity. The flux terms in the summations $q_{OLD}^{\gamma \to \alpha}$ and $q_{OLD}^{\gamma \to \beta}$ provide an estimate of fluxes that are likely to exist at different faces on elements $\alpha$ and $\beta$, respectively.

The physical interpretation of the two flux terms $q_{m_{app}}^{\beta \to \alpha}$ and $q_{m_{bal}}^{\beta \to \alpha}$ is as follows. The applied flux $q_{m_{app}}^{\beta \to \alpha}$ represents the portion of the total flux $q_m^{\beta \to \alpha}$ (given by equation (1)) that can be used towards temperature evolution of the element $\alpha$ without introducing numerical instability. This form can be derived from first principles for an isolated system consisting of elements $\alpha$ and $\beta$ to include an estimate of the effect of a continuously evolving temperature field in the vicinity of this system. For this reason, this term shows dependence both on the geometric/thermal properties of the elements ($C_m^{\alpha\beta}$), as well as the interaction of these elements with the surroundings ($\Delta G$).

In equation (4) the term $q_{m_{app}}^{\beta \to \alpha}$ still depends on fluxes observed at other faces at the previous time-step to provide an estimate of the ongoing interaction at those faces during the current time-step. For strongly transient problems, this results in a mismatch between $q_m^{\beta \to \alpha}$ and $q_{m_{app}}^{\beta \to \alpha}$. However, the second term called the balance flux $q_{m_{bal}}^{\beta \to \alpha}$ accounts for this mismatch, which is transmitted through a to its neighboring elements on the other side of the spatial interface $\alpha\beta$. This balance flux is applied for temperature evolution only when it is deposited in an element large enough to satisfy CFL constraint until which it is successively transmitted along the flux direction.

The above scheme rigorously ensures that at a the spatial interface $\alpha\beta$. between any two elements $\alpha$ and $\beta$, the correct amount of total flux $(=q_m^{\beta \to \alpha})$ is incorporated, while precisely controlling the amount of flux available for temperature evolution of small sized elements, e.g., element $\alpha$ in this example. Overall, this scheme is able to maintain numerical stability, as well as good spatial and temporal accuracy. In addition, at steady state, the applied flux becomes equal to the full flux, $q_{m_{app}}^{\beta \to \alpha} = q_m^{\beta \to \alpha}$, and, as a consequence, the balance flux becomes equal to zero, $q_{m_{bal}}^{\beta \to \alpha} = 0$.

Features of the Modified Flux Calculation Process

As noted in the above description, and as illustrated in FIGS. 5-7, the modified flux calculation approach 36 includes several algorithmic processes.

Referring now to FIG. 5, heat flux is computed by identifying 52a spatial faces at which the modified calculation of heat flux is to be applied, e.g., faces at which the CFL condition may be violated. At the faces where the CFL condition is not violated the standard definition of heat flux is used 52b (equation 3), whereas at the faces where the CFL condition is violated, e.g., any face between two elements at least one of which violates the CFL condition criterion, the modified heat flux calculation is used 52c.

The total heat flux amount is computed using a spatially averaged temperature gradient in the vicinity of the elements under consideration to ensure smoothness of solution. (In contrast, the standard heat flux utilizes a temperature gradient computed based on the traditional difference form.) The modified heat flux calculation process 52 includes partitioning 52d the modified heat flux into two parts—the applied flux 49b and the balance flux 49c terms. The flux calculation is performed 52e according to the partitioning.

Referring now to FIG. 6, the calculation for flux uses the applied flux calculation 52f (eq. 3) that is always used in the temperature evolution equation of the element under consideration. The an applied flux term $q_{m_{app}}^{\beta \to \alpha}$ is used for temperature evolution (in the summation term in equation 3 above) for a.

Referring now to FIG. 7, the balance flux may or may not be used in the temperature evolution depending on the size of the elements α,β involved. If, for example, α is small enough so as to violate the CFL constraint 52g, the balance flux is calculated 52h and is transmitted 52i to the neighboring element(s) in the direction of the flux flow. If the neighboring element is large enough so as not to violate the CFL constraint, the balance flux is used 52j towards temperature evolution. The balance flux is successively transmitted along the direction of the flux flow until the balance flux is eventually transferred to a large enough element (enough so as not to violate the CFL constraint), where balanced flux is applied towards temperature evolution.

Potential Advantages of the Modified Flux Calculation Process

A few approaches are known to overcome the issue of numerical instability in diffusion problems on irregular grids with varying element sizes. The most commonly used approach is to enforce additional constraints on the grid generation tool to reduce such scenarios. Even then, since the issue cannot be completely avoided, it is common practice to use either a global time-step which is small enough to ensure stability or to use local sub-cycling when small grid elements are encountered. The first approach (small global time-step) substantially increases the computational cost even if there is a single occurrence of small sized element anywhere on the spatial grid while the second approach (local sub-cycling) increases the complexity of the algorithm and its implementation.

An alternative approach is to use an implicit scheme instead of the explicit scheme, or at least limit use of the explicit scheme to local region(s) close to the small elements. This implicit scheme approach suffers from implementation complexity as well as non-local nature of the solution that provides systems of equations that are not convenient for massively parallel computer implementations.

In contrast, the above described modified flux calculation approach offers several distinct advantages over existing approaches. The modified flux calculation approach allows use of a single time-step size that is selected based on time accuracy considerations, rather than being the size of the smallest element in the grid. For various scenarios, this approach can minimize computational cost relative to global time step, while providing a relatively easier implementation than e.g., implicit schemes or local sub-cycling schemes.

The modified flux calculation approach has a dependence on the geometric properties of the two neighboring elements, thus ensuring that the modified flux calculation approach would work irrespective of the size of the elements. The usual constraints on grid generation (grid quality, size, etc.) can be relaxed to a large degree. The computational cost of computing the variously terms is reasonable, as the mathematical form of the term is simple and does not involve multiple iterations, in contrast to existing approaches (reducing time-step size or using a hybrid implicit-explicit scheme).

In addition, due to the volumetric nature of the formulation, the modified flux calculation approach maintains exact conservation, which is a requirement in many applications. The modified flux calculations are still explicit in nature and require information from elements within a small distance from the element under consideration. The explicitness implies that minimal changes are needed to an existing computational system from an original system implementation. The parallelization characteristics of the original explicit method are retained and thus the modified flux calculation approach can take advantage of massively parallel computer implementations. This modified flux calculation approach presents advantages in comparison with existing methodologies. Although the above description of the flux calculation modification approach was based on a finite volume formulation for heat conduction, this approach is applicable to many other diffusion-dominated problems/approaches.

Model Simulation Space

In a LBM-based physical process simulation system, fluid flow is represented by the distribution function values $f_i$, evaluated at a set of discrete velocities $c_i$. The dynamics of the distribution function is governed by Equation I1 where $f_i(0)$ is known as the equilibrium distribution function, defined as:

$$f_\alpha^{(0)} = w_\alpha \rho \left[ 1 + u_\alpha + \frac{u_\alpha^2 - u^2}{2} + \frac{u_\alpha(u_\alpha^2 - 3u^2)}{6} \right] \quad \text{Eq. (I1)}$$

$$\text{where } u_\alpha = c_i \cdot \frac{u}{T}$$

This equation is the well-known lattice Boltzmann equation that describes the time-evolution of the distribution function, $f_i$. The left-hand side represents the change of the distribution due to the so-called "streaming process." The streaming process is when a pocket of fluid starts out at a mesh location, and then moves along one of plural velocity vectors to the next mesh location. At that point, the "collision factor," i.e., the effect of nearby pockets of fluid on the starting pocket of fluid, is calculated. The fluid can only move to another mesh location, so the proper choice of the velocity vectors is necessary so that all the components of all velocities are multiples of a common speed.

The right-hand side of the first equation is the aforementioned "collision operator" which represents the change of the distribution function due to the collisions among the pockets of fluids. The particular form of the collision operator is of the Bhatnagar, Gross and Krook (BGK) operator. The collision operator forces the distribution function to go to the prescribed values given by the second equation, which is the "equilibrium" form.

The BGK operator is constructed according to the physical argument that, no matter what the details of the collisions, the distribution function approaches a well-defined local equilibrium given by $\{f^{eq}(x, v, t)\}$ via collisions:

$$C = -\frac{1}{\tau}(f - f^{eq}), \quad \text{Eq. (I2)}$$

where the parameter τ represents a characteristic relaxation time to equilibrium via collisions. Dealing with particles (e.g., atoms or molecules) the relaxation time is typically taken as a constant.

From this simulation, conventional fluid variables, such as mass p and fluid velocity u, are obtained as simple summations in Equation (13).

$$\rho(x, t) = \sum_i f_i(x, t); \rho u(x, t) = \sum_i c_i f_i(x, t); \quad \text{Eq. (I3)}$$

$$DT(x, t) = \sum_i (c_i - u)^2 f_i(x, t)$$

where ρ, u, and T are, respectively, the fluid density, velocity and temperature, and D is the dimension of the discretized velocity space (not necessarily equal to the physical space dimension).

Due to symmetry considerations, the set of velocity values are selected in such a way that they form certain lattice structures when spanned in the configuration space. The dynamics of such discrete systems obeys the LBE having the form $$f_i(x+c_i,t+1)-f_i(x,t)=C_i(x,t)$$

where the collision operator usually takes the BGK form as described above. By proper choice of the equilibrium distribution forms, it can be theoretically shown that the lattice Boltzmann equation gives rise to correct hydrodynamics and thermo-hydrodynamics. That is, the hydrodynamic moments derived from $f_i(x, t)$ obey the Navier-Stokes equations in the macroscopic limit. These moments are defined by Equation (13) above.

The collective values of $c_i$ and $w_i$ define a LBM model. The LBM model can be implemented efficiently on scalable computer platforms and run with great robustness for time unsteady flows and complex boundary conditions.

A standard technique of obtaining the macroscopic equation of motion for a fluid system from the Boltzmann equation is the Chapman-Enskog method in which successive approximations of the full Boltzmann equation are taken. In a fluid system, a small disturbance of the density travels at the speed of sound. In a gas system, the speed of sound is generally determined by the temperature. The importance of the effect of compressibility in a flow is measured by the ratio of the characteristic velocity and the sound speed, which is known as the Mach number.

A general discussion of a LBM-based simulation system is provided below that may be used in conjunction with a CAD process to conduct fluid flow simulations.

Figure 8:
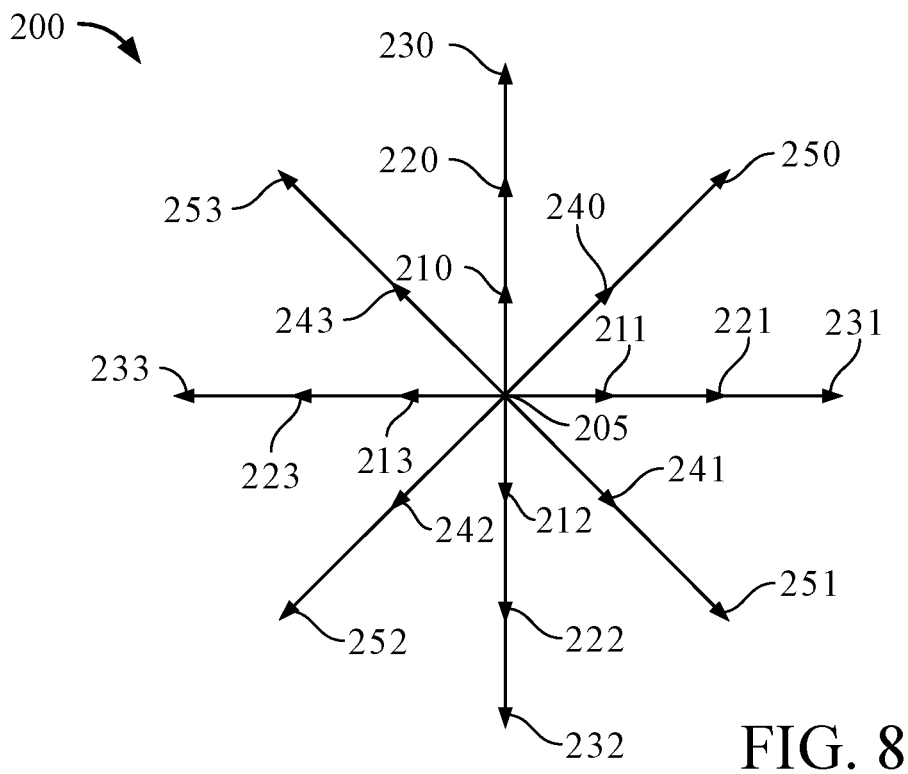
FIGS. 8 and 9 illustrate velocity components of two LBM models represented in Euclidian space (prior art).

Referring to FIG. 8, a first model (2D-1) 200 is a two-dimensional model that includes 21 velocities. Of these 21 velocities, one (205) represents particles that are not moving; three sets of four velocities represent particles that are moving at either a normalized speed (r) (210-213), twice the normalized speed (2r) (220-223), or three times the normalized speed (3r) (230-233) in either the positive or negative direction along either the x or y axis of the lattice; and two sets of four velocities represent particles that are moving at the normalized speed (r) (240-243) or twice the normalized speed (2r) (250-253) relative to both of the x and y lattice axes.

Figure 9:
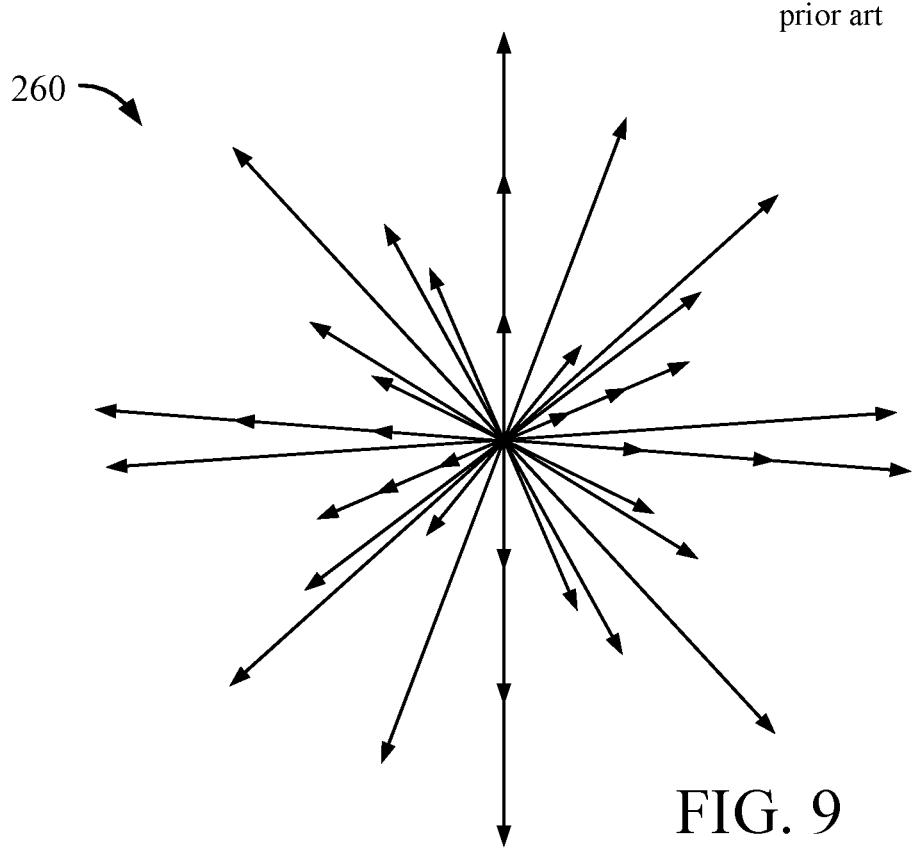

Referring to FIG. 9, illustrated is a second model (3D-1) 260—a three-dimensional model that includes 39 velocities where each velocity is represented by one of the arrowheads of FIG. 9. Of these 39 velocities, one represents particles that are not moving; three sets of six velocities represent particles that are moving at either a normalized speed (r), twice the normalized speed (2r), or three times the normalized speed (3r) in either the positive or negative direction along the x, y or z axis of the lattice; eight represent particles that are moving at the normalized speed (r) relative to all three of the x, y, z lattice axes; and twelve represent particles that are moving at twice the normalized speed (2r) relative to two of the x, y, z lattice axes.

More complex models, such as a 3D-2 model includes 101 velocities and a 2D-2 model includes 37 velocities also may be used. For the three-dimensional model 3D-2, of the 101 velocities, one represents particles that are not moving (Group 1); three sets of six velocities represent particles that are moving at either a normalized speed (r), twice the normalized speed (2r), or three times the normalized speed (3r) in either the positive or negative direction along the x, y or z axis of the lattice (Groups 2, 4, and 7); three sets of eight represent particles that are moving at the normalized speed (r), twice the normalized speed (2r), or three times the normalized speed (3r) relative to all three of the x, y, z lattice axes (Groups 3, 8, and 10); twelve represent particles that are moving at twice the normalized speed (2r) relative to two of the x, y, z lattice axes (Group 6); twenty four represent particles that are moving at the normalized speed (r) and twice the normalized speed (2r) relative to two of the x, y, z lattice axes, and not moving relative to the remaining axis (Group 5); and twenty four represent particles that are moving at the normalized speed (r) relative to two of the x, y, z lattice axes and three times the normalized speed (3r) relative to the remaining axis (Group 9).

For the two-dimensional model 2D-2, of the 37 velocities, one represents particles that are not moving (Group 1); three sets of four velocities represent particles that are moving at either a normalized speed (r), twice the normalized speed (2r), or three times the normalized speed (3r) in either the positive or negative direction along either the x or y axis of the lattice (Groups 2, 4, and 7); two sets of four velocities represent particles that are moving at the normalized speed (r) or twice the normalized speed (2r) relative to both of the x and y lattice axes; eight velocities represent particles that are moving at the normalized speed (r) relative to one of the x and y lattice axes and twice the normalized speed (2r) relative to the other axis; and eight velocities represent particles that are moving at the normalized speed (r) relative to one of the x and y lattice axes and three times the normalized speed (3r) relative to the other axis.

The LBM models described above provide a specific class of efficient and robust discrete velocity kinetic models for numerical simulations of flows in both two- and three-dimensions. A model of this kind includes a particular set of discrete velocities and weights associated with those velocities. The velocities coincide with grid points of Cartesian coordinates in velocity space which facilitates accurate and efficient implementation of discrete velocity models, particularly the kind known as the lattice Boltzmann models. Using such models, flows can be simulated with high fidelity.

Figure 10:
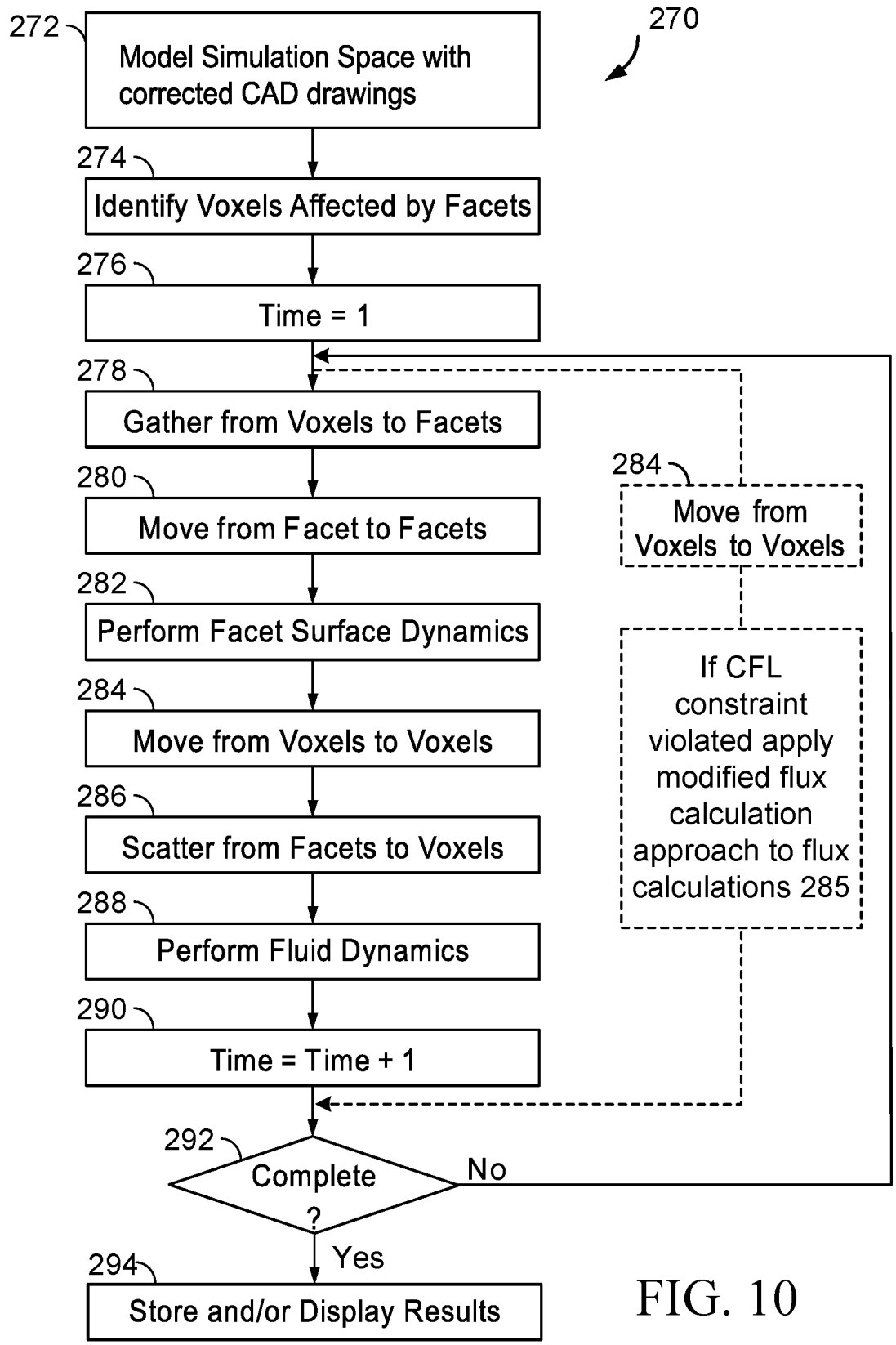
FIG. 10 is a flow chart of a procedure followed by a physical process simulation system using modified heat flux calculations between two neighboring elements.

Referring to FIG. 10, a physical process simulation system operates according to a procedure 270 to simulate a physical process such as fluid flow using a CAD process as discussed above. Prior to the simulation, a simulation space is modeled as a collection of voxels (step 272). Typically, the simulation space is generated using a computer-aided-design (CAD) program. For example, a CAD program could be used to draw an micro-device positioned in a wind tunnel. Thereafter, data produced by the CAD program is processed to add a lattice structure having appropriate resolution and to account for objects and surfaces within the simulation space.

The physical process simulation system operates according to the procedure 270 using the modified flux calculation process discussed above. The resolution of the lattice may be selected based on the Reynolds number of the system being simulated. The Reynolds number is related to the viscosity (v) of the flow, the characteristic length (L) of an object in the flow, and the characteristic velocity (u) of the flow:

$$Re=uL/v \qquad \text{Eq. (14)}$$

The characteristic length of an object represents large scale features of the object. For example, if flow around a micro-device were being simulated, the height of the micro-device might be considered to be the characteristic length.

When flow around small regions of an object (e.g., the side mirror of an automobile) is of interest, the resolution of the simulation may be increased, or areas of increased resolution may be employed around the regions of interest. The dimensions of the voxels decrease as the resolution of the lattice increases.

The state space is represented as $f_i(x, t)$, where $f_i$ represents the number of elements, or particles, per unit volume in state i (i.e., the density of particles in state i) at a lattice site denoted by the three-dimensional vector x at a time t. For a known time increment, the number of particles is referred to simply as $f_i(x)$. The combination of all states of a lattice site is denoted as $f(x)$.

The number of states is determined by the number of possible velocity vectors within each energy level. The velocity vectors consist of integer linear speeds in a space having three dimensions: x, y, and z. The number of states is increased for multiple-species simulations.

Each state i represents a different velocity vector at a specific energy level (i.e., energy level zero, one or two). The velocity $c_i$ of each state is indicated with its "speed" in each of the three dimensions as follows:

$$c_i = (c_{ix}, c_{iy}, c_{iz}).$$  Eq.(15)

The energy level zero state represents stopped particles that are not moving in any dimension, i.e. $c_{stopped} = (0, 0, 0)$. Energy level one states represents particles having a ±1 speed in one of the three dimensions and a zero speed in the other two dimensions. Energy level two states represent particles having either a ±1 speed in all three dimensions, or a ±2 speed in one of the three dimensions and a zero speed in the other two dimensions.

Generating all of the possible permutations of the three energy levels gives a total of 39 possible states (one energy zero state, 6 energy one states, 8 energy three states, 6 energy four states, 12 energy eight states and 6 energy nine states.).

Each voxel (i.e., each lattice site) is represented by a state vector f(x). The state vector completely defines the status of the voxel and includes 39 entries. The 39 entries correspond to the one energy zero state, 6 energy one states, 8 energy three states, 6 energy four states, 12 energy eight states and 6 energy nine states. By using this velocity set, the system can produce Maxwell-Boltzmann statistics for an achieved equilibrium state vector.

For processing efficiency, the voxels are grouped in 2×2×2 volumes called microblocks. The microblocks are organized to permit parallel processing of the voxels and to minimize the overhead associated with the data structure. A short-hand notation for the voxels in the microblock is defined as $N_i(n)$, where n represents the relative position of the lattice site within the microblock and $n \in \{0, 1, 2, \ldots, 7\}$.

Figure 11:
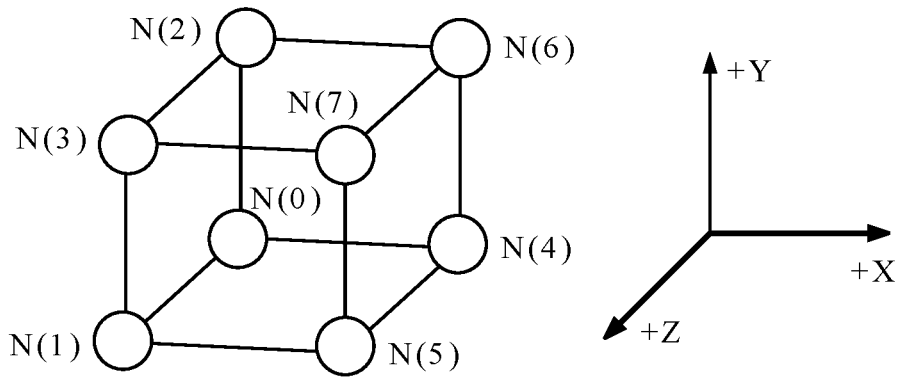
FIG. 11 is a perspective view of a microblock (prior art).

A microblock is illustrated in FIG. 11.

Figure 12A:
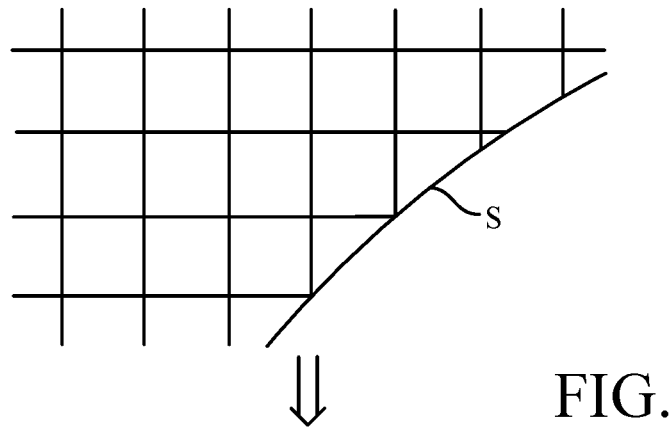
FIGS. 12A-12B are illustrations (prior art) of lattice structures used by the system of FIG. 1.
Figure 12B:
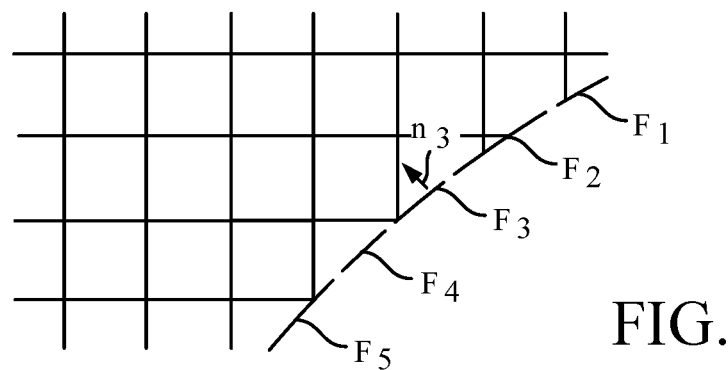

Referring to FIGS. 12A and 12B, a surface S (FIG. 12A) is represented in the simulation space (FIG. 13B) as a collection of facets $F_\alpha$:

$$S = \{F_\alpha\}$$  Eq.(16)

where α is an index that enumerates a particular facet. A facet is not restricted to the voxel boundaries, but is typically sized on the order of or slightly smaller than the size of the voxels adjacent to the facet so that the facet affects a relatively small number of voxels. Properties are assigned to the facets for the purpose of implementing surface dynamics. In particular, each facet $F_\alpha$ has a unit normal ($n_\alpha$), a surface area ($A_\alpha$), a center location ($x_\alpha$), and a facet distribution function ($f_i(\alpha)$) that describes the surface dynamic properties of the facet. The total energy distribution function $q_i(\alpha)$ is treated in the same way as the flow distribution for facet and voxel interaction.

Figure 13:
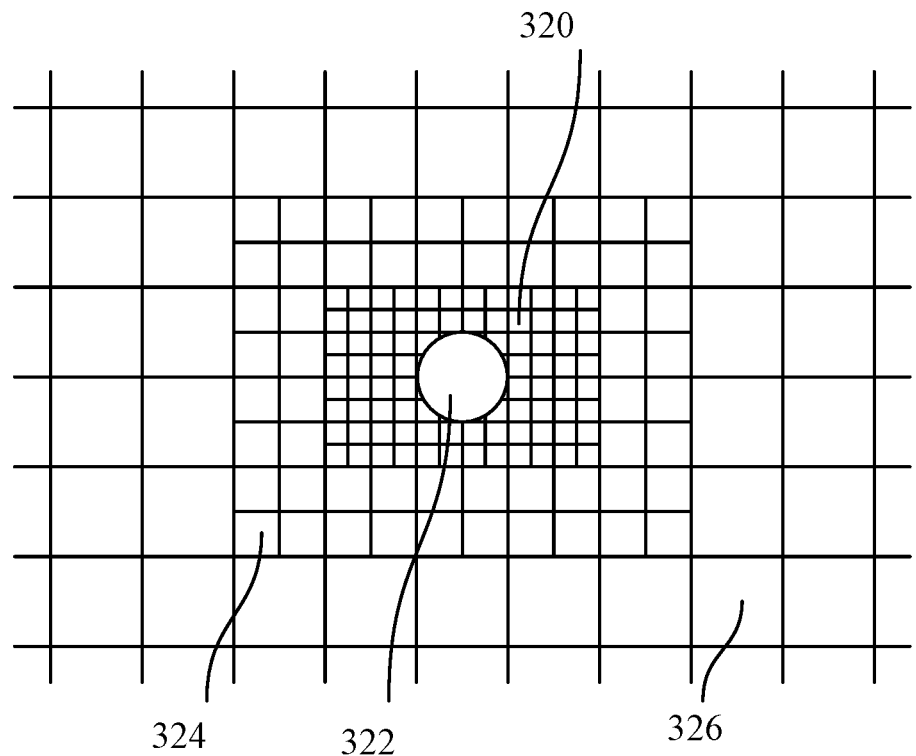
FIGS. 13 and 14 illustrate variable resolution techniques (prior art).

Referring to FIG. 13, different levels of resolution may be used in different regions of the simulation space to improve processing efficiency. Typically, the region 320 around an object 322 is of the most interest and is therefore simulated with the highest resolution. Because the effect of viscosity decreases with distance from the object, decreasing levels of resolution (i.e., expanded voxel volumes) are employed to simulate regions 324, 326 that are spaced at increasing distances from the object 322.

Figure 14:
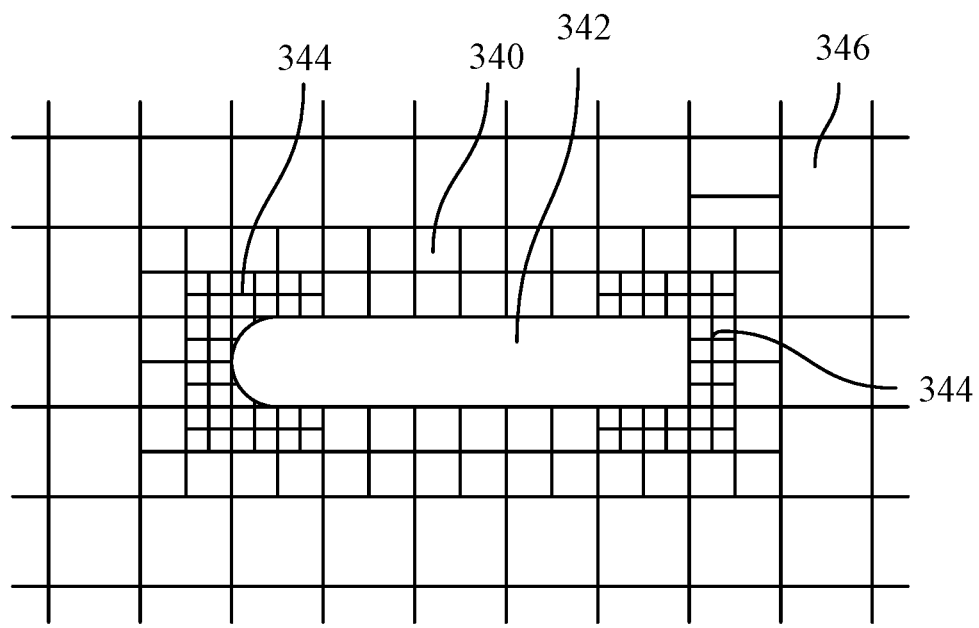

Similarly, as illustrated in FIG. 14, a lower level of resolution may be used to simulate a region 340 around less significant features of an object 342 while the highest level of resolution is used to simulate regions 344 around the most significant features (e.g., the leading and trailing surfaces) of the object 342. Outlying regions 346 are simulated using the lowest level of resolution and the largest voxels.

C. Identify Voxels Affected by Facets

Referring again to FIG. 10, once the simulation space has been modeled (step 272), voxels affected by one or more facets are identified (step 274). Voxels may be affected by facets in a number of ways. First, a voxel that is intersected by one or more facets is affected in that the voxel has a reduced volume relative to non-intersected voxels. This occurs because a facet, and material underlying the surface represented by the facet, occupies a portion of the voxel. A fractional factor $P_f(x)$ indicates the portion of the voxel that is unaffected by the facet (i.e., the portion that can be occupied by a fluid or other materials for which flow is being simulated). For non-intersected voxels, $P_f(x)$ equals one.

Voxels that interact with one or more facets by transferring particles to the facet or receiving particles from the facet are also identified as voxels affected by the facets. All voxels that are intersected by a facet will include at least one state that receives particles from the facet and at least one state that transfers particles to the facet. In most cases, additional voxels also will include such states.

Figure 15:
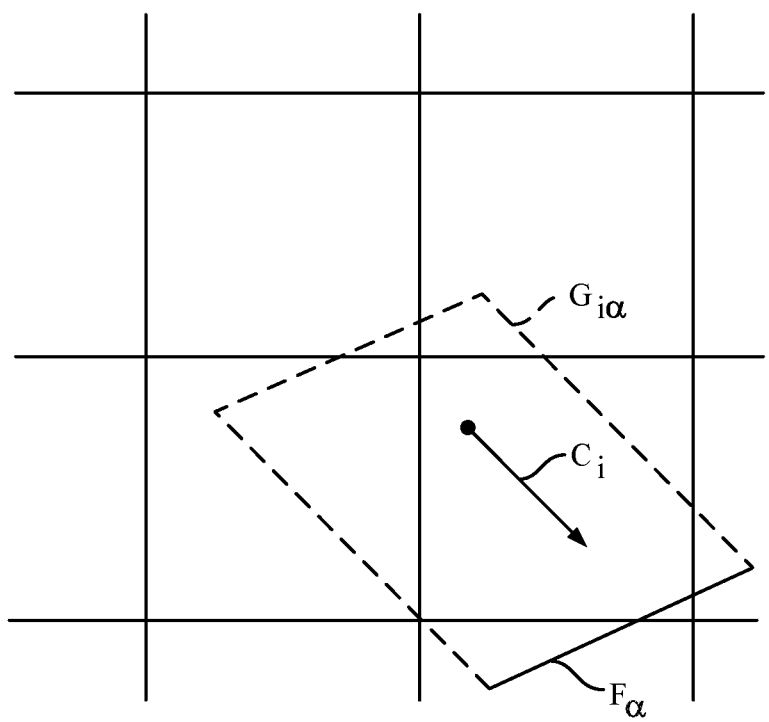
FIG. 15 illustrates movement of particles (prior art).

Referring to FIG. 15, for each state i having a non-zero velocity vector a facet $F_\alpha$ receives particles from, or transfers particles to, a region defined by a parallelepiped $G_{i\alpha}$ having a height defined by the magnitude of the vector dot product of the velocity vector $c_i$ and the unit normal $n_\alpha$ of the facet ($|c_i n_\alpha|$) and a base defined by the surface area $A_\alpha$ of the facet so that the volume $V_{i\alpha}$ of the parallelepiped $G_{i\alpha}$ equals:

$$V_{i\alpha} = |c_i n_\alpha| A_\alpha$$  Eq.(17)

The facet $F_\alpha$ receives particles from the volume $V_{i\alpha}$ when the velocity vector of the state is directed toward the facet ($|c_i n_\alpha| < 0$), and transfers particles to the region when the velocity vector of the state is directed away from the facet ($|c_i n_\alpha| > 0$). As will be discussed below, this expression should be modified when another facet occupies a portion of the parallelepiped $G_{i\alpha}$, a condition that could occur in the vicinity of non-convex features such as interior corners.

The parallelepiped $G_{i\alpha}$ of a facet $F_\alpha$ may overlap portions or all of multiple voxels. The number of voxels or portions thereof is dependent on the size of the facet relative to the size of the voxels, the energy of the state, and the orientation of the facet relative to the lattice structure. The number of affected voxels increases with the size of the facet. Accordingly, the size of the facet, as noted above, is typically selected to be on the order of or smaller than the size of the voxels located near the facet.

The portion of a voxel N(x) overlapped by a parallelepiped $G_{i\alpha}$ is defined as $V_{i\alpha}(x)$. Using this term, the flux $\Gamma_{i\alpha}(x)$ of state i particles that move between a voxel N(x) and a facet $F_\alpha$ equals the density of state i particles in the voxel ($N_i(x)$) multiplied by the volume of the region of overlap with the voxel ($V_{i\alpha}(x)$):

$$\Gamma_{i\alpha}(x) = N_i(x) + V_{i\alpha}(x). \qquad \text{Eq.(I8)}$$

When the parallelepiped $G_{i\alpha}$ is intersected by one or more facets, the following condition is true:

$$V_{i\alpha} = \Sigma V_\alpha(x) + \Sigma V_{i\alpha}(\beta) \qquad \text{Eq.(I9)}$$

where the first summation accounts for all voxels overlapped by $G_{i\alpha}$ and the second term accounts for all facets that intersect $G_{i\alpha}$. When the parallelepiped $G_{i\alpha}$ is not intersected by another facet, this expression reduces to:

$$V_{i\alpha} = \Sigma V_{i\alpha}(x). \qquad \text{Eq.(I10)}$$

D. Perform Simulation

Once the voxels that are affected by one or more facets are identified (step 274), a timer is initialized to begin the simulation (step 276). During each time increment of the simulation, movement of particles from voxel to voxel is simulated by an advection stage (steps 278-286) that accounts for interactions of the particles with surface facets. Next, a collision stage (step 288) simulates the interaction of particles within each voxel. Thereafter, the timer is incremented (step 200). If the incremented timer does not indicate that the simulation is complete (step 202), the advection and collision stages (steps 278-200) are repeated. If the incremented timer indicates that the simulation is complete (step 202), results of the simulation are stored and/or displayed (step 204).

1. Boundary Conditions for Surface

To correctly simulate interactions with a surface, each facet should meet four boundary conditions. First, the combined mass of particles received by a facet should equal the combined mass of particles transferred by the facet (i.e., the net mass flux to the facet should equal zero). Second, the combined energy of particles received by a facet should equal the combined energy of particles transferred by the facet (i.e., the net energy flux to the facet should equal zero). These two conditions may be satisfied by requiring the net mass flux at each energy level (i.e., energy levels one and two) to equal zero.

The other two boundary conditions are related to the net momentum of particles interacting with a facet. For a surface with no skin friction, referred to herein as a slip surface, the net tangential momentum flux should equal zero and the net normal momentum flux should equal the local pressure at the facet. Thus, the components of the combined received and transferred momentums that are perpendicular to the normal $n_\alpha$ of the facet (i.e., the tangential components) should be equal, while the difference between the components of the combined received and transferred momentums that are parallel to the normal $n_\alpha$ of the facet (i.e., the normal components) should equal the local pressure at the facet. For non-slip surfaces, friction of the surface reduces the combined tangential momentum of particles transferred by the facet relative to the combined tangential momentum of particles received by the facet by a factor that is related to the amount of friction.

2. Gather From Voxels to Facets

As a first step in simulating interaction between particles and a surface, particles are gathered from the voxels and provided to the facets (step 278). As noted above, the flux of state i particles between a voxel N(x) and a facet F. is:

$$\Gamma_{i\alpha}(x) = N_i(x) V_{i\alpha}(x). \qquad \text{Eq.(I11)}$$

From this, for each state i directed toward a facet $F_\alpha$ ($c_i n_\alpha < 0$), the number of particles provided to the facet F. by the voxels is:

$$\Gamma_{i\alpha V \to F} = \Sigma_x \Gamma_{i\alpha}(x) = \Sigma_x N_i(x) V_{i\alpha}(x) \qquad \text{Eq.(I12)}$$

Only voxels for which $V_{i\alpha}(x)$ has a non-zero value should be summed. As noted above, the size of the facets is selected so that $V_{i\alpha}(x)$ has a non-zero value for only a small number of voxels. Because $V_{i\alpha}(x)$ and $P_f(x)$ may have non-integer values, $\Gamma_\alpha(x)$ is stored and processed as a real number.

3. Move From Facet to Facet

Next, particles are moved between facets (step 280). If the parallelepiped $G_{i\alpha}$ for an incoming state ($c_i n_\alpha < 0$) of a facet $F_\alpha$ is intersected by another facet $F_\beta$, then a portion of the state i particles received by the facet $F_\alpha$ will come from the facet $F_\beta$. In particular, facet $F_\alpha$ will receive a portion of the state i particles produced by facet $F_\beta$ during the previous time increment.

Figure 17:
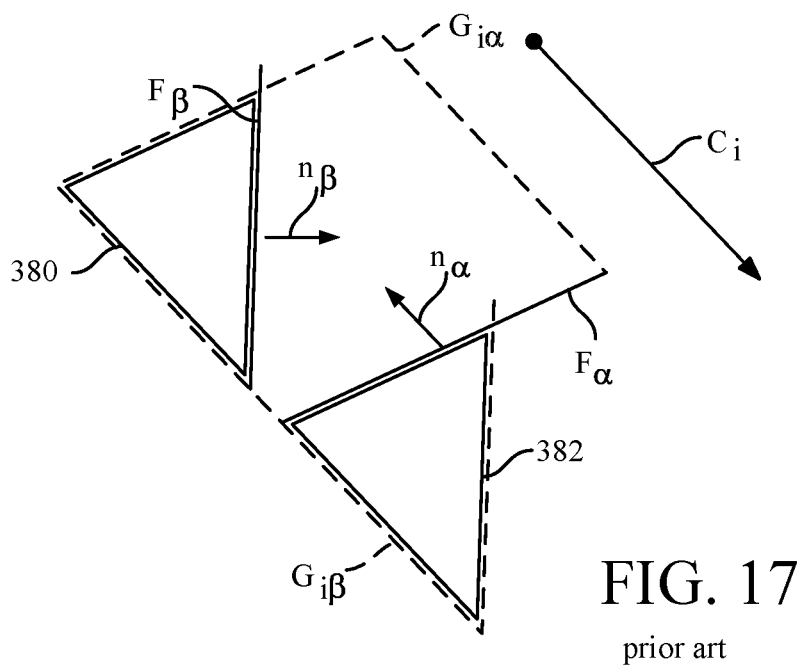
FIG. 17 illustrates surface dynamics (prior art).

Referring now to FIG. 17 where a relationship of the state i particles produced by facet $F_\beta$ during the previous time increment is illustrated. In FIG. 17, it is shown that a portion 380 of the parallelepiped $G_{i\alpha}$ that is intersected by facet $F_\beta$ equals a portion 382 of the parallelepiped $G_{i\beta}$ that is intersected by facet $F_\alpha$. As noted above, the intersected portion is denoted as $V_{i\alpha}(\beta)$. Using this term, the flux of state i particles between a facet $F_\beta$ and a facet $F_\alpha$ may be described as:

$$\Gamma_{i\alpha}(\beta, t-1) = \Gamma_i(\beta) V_{i\alpha}(\beta) V_{i\alpha} \qquad \text{Eq.(I13)}$$

where $\Gamma_i(\beta, t-1)$ is a measure of the state i particles produced by the facet $F_\beta$ during the previous time increment. From this, for each state i directed toward a facet $F_\alpha$ ($c_i n_\alpha < 0$), the number of particles provided to the facet $F_\alpha$ by the other facets is:

$$\Gamma_{i\alpha F \to F} = \Sigma_\beta \Gamma_{i\alpha}(\beta) = \Sigma_\beta \Gamma_i(\beta, t-1) V_{i\alpha}(\beta) / V_{i\alpha} \qquad \text{Eq.(I14)}$$

and the total flux of state i particles into the facet is:

$$\Gamma_{iIN}(\alpha) = \Gamma_{i\alpha F \to F} + \Gamma_{i\alpha F \to F} = \Sigma_x N_i(x) V_{i\alpha} + \Sigma_\beta \Gamma_i(\beta, t-1) V_{i\alpha}(\beta) / V_{i\alpha} \qquad \text{Eq.(I15)}$$

The state vector N($\alpha$) for the facet, also referred to as a facet distribution function, has M entries corresponding to the M entries of the voxel states vectors. M is the number of discrete lattice speeds. The input states of the facet distribution function N($\alpha$) are set equal to the flux of particles into those states divided by the volume $V_{i\alpha}$:

$$N_i(\alpha) = \Gamma_{iIN}(\alpha) / V_{i\alpha} \qquad \text{Eq.(I16)}$$

for $c_i n_\alpha < 0$.

The facet distribution function is a simulation tool for generating the output flux from a facet, and is not necessarily representative of actual particles. To generate an accurate output flux, values are assigned to the other states of the distribution function. Outward states are populated using the technique described above for populating the inward states:

$$N_i(\alpha) = \Gamma_{iOTHER}(\alpha) / V_{i\alpha} \qquad \text{Eq.(I17)}$$

for $c_i n_\alpha \geq 0$, wherein $\Gamma_{iOTHER}(\alpha)$ is determined using the technique described above for generating $\Gamma_{iIN}(\alpha)$, but applying the technique to states ($c_i n_\alpha \geq 0$) other than incoming states ($c_i n_\alpha < 0$)). In an alternative approach, $\Gamma_{iOTHER}(\alpha)$ may be generated using values of $\Gamma_{iOUT}(\alpha)$ from the previous time step so that:

$$\Gamma_{iOTHER}(\alpha, t) = \Gamma_{iOUT}(\alpha, t-1). \qquad \text{Eq.(I18)}$$

For parallel states ($c_i n_\alpha = 0$), both $V_{i\alpha}$ and $V_{i\alpha}(x)$ are zero. In the expression for $N_i(\alpha)$, $V_{i\alpha}(x)$ appears in the numerator (from the expression for $\Gamma_{iOTHER}(\alpha)$ and $V_{i\alpha}$ appears in the denominator (from the expression for $N_i(\alpha)$). Accordingly, $N_i(\alpha)$ for parallel states is determined as the limit of $N_i(\alpha)$ as $V_{i\alpha}$ and $V_{i\alpha}(x)$ approach zero. The values of states having zero velocity (i.e., rest states and states (0, 0, 0, 2) and (0, 0, 0, −2)) are initialized at the beginning of the simulation based on initial conditions for temperature and pressure. These values are then adjusted over time.

4. Perform Facet Surface Dynamics

Figure 18:
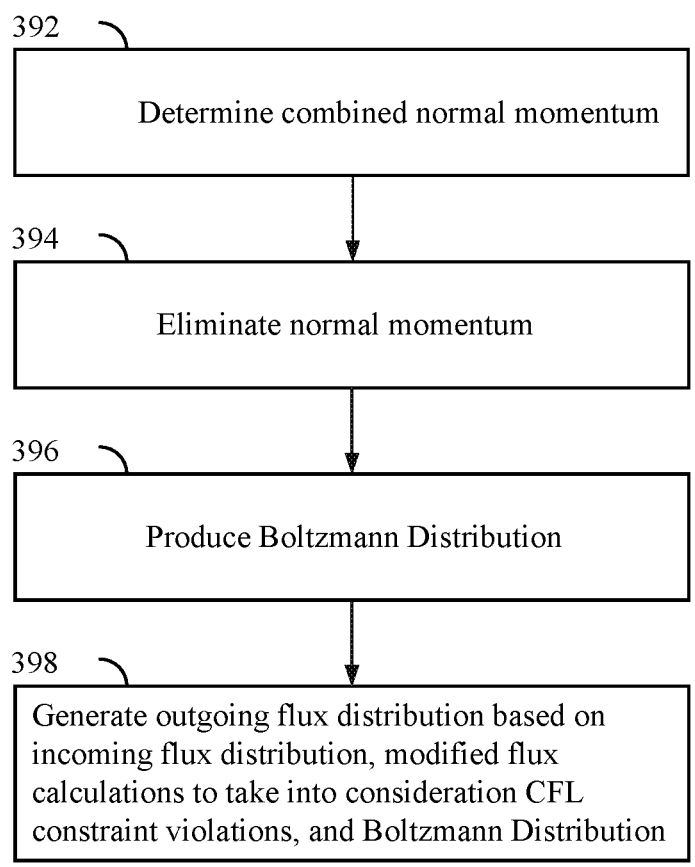
FIG. 18 is a flow chart of a procedure for performing surface dynamics with modified flux calculations.

Next, surface dynamics are performed for each facet to satisfy the four boundary conditions discussed above (step 282). A procedure for performing surface dynamics for a facet is illustrated in FIG. 18. Initially, the combined momentum normal to the facet $F_\alpha$ is determined (step 392) by determining the combined momentum $P(\alpha)$ of the particles at the facet as:

$$P(\alpha)=\Sigma_i c_i * N_i^\alpha \qquad \text{Eq.(I.19)}$$

for all i. From this, the normal momentum $P_n(\alpha)$ is determined as:

$$P_n(\alpha)=n_\alpha \cdot P(\alpha). \qquad \text{Eq.(I.20)}$$

This normal momentum is then eliminated using a pushing/pulling technique (step 394) to produce $N_{n-}(\alpha)$. According to this technique, particles are moved between states in a way that affects only normal momentum. The pushing/pulling technique is described in U.S. Pat. No. 5,594,671, which is incorporated by reference.

Thereafter, the particles of $N_{n-}(\alpha)$ are collided to produce a Boltzmann distribution $N_{n-\beta}(\alpha)$ (step 396). As described below with respect to performing fluid dynamics, a Boltzmann distribution may be achieved by applying a set of collision rules to $N_{n-}(\alpha)$.

An outgoing flux distribution for the facet $F_\alpha$ is determined (step 398) based on the incoming flux distribution, modified flux calculations to take into consideration CFL constraint violations, and Boltzmann Distribution.

First, the difference between the incoming flux distribution $\Gamma_i(\alpha)$ and the Boltzmann distribution is determined as:

$$\Delta\Gamma_i(\alpha)=\Gamma_{iIN}(\alpha)-N_{n-\beta i}(\alpha)V_{i\alpha} \qquad \text{Eq.(I.21)}$$

Using this difference, the outgoing flux distribution is:

$$\Gamma_{iOUT}(\alpha)=N_{n-\beta i}(\alpha)V_{i\alpha}-\Delta\cdot\Gamma_i*(\alpha), \qquad \text{Eq.(I.22)}$$

for $n_\alpha c_i > 0$ and where i* is the state having a direction opposite to state i. For example, if state i is (1, 1, 0, 0), then state i* is (−1, −1, 0, 0). To account for skin friction and other factors, the outgoing flux distribution may be further refined to:

$$\Gamma_{iOUT}(\alpha) = N_{n-Bi}(\alpha)V_{i\alpha} - \Delta\Gamma_i * (\alpha) + $$
$$C_f(n_\alpha \cdot c_i) - [N_{n-\beta i}*(\alpha) - N_{n-\beta i}(\alpha)]V_{i\alpha} + $$
$$(n_\alpha \cdot c_i)(t_{1\alpha}\cdot c_i)\Delta N_{j,1}V_{i\alpha} + (n_\alpha \cdot c_i)(t_{2\alpha}\cdot c_i)\Delta N_{j,2}V_{i\alpha} \qquad \text{Eq. (I.23)}$$

for $n_\alpha c_i > 0$, where $C_f$ is a function of skin friction, $t_{1\alpha}$ is a first tangential vector that is perpendicular to $n_\alpha$, $t_{2\alpha}$ is a second tangential vector that is perpendicular to both $n_\alpha$ and $t_{1\alpha}$, and $\Delta N_{j,1}$ and $\Delta N_{j,2}$ are distribution functions corresponding to the energy (j) of the state i and the indicated tangential vector. The distribution functions are determined according to:

$$\Delta N_{j,1,2} = -\frac{1}{2j^2}\left(n_\alpha \sum_i c_i c_i N_{n-Bi}(\alpha) \cdot t_{1,2\alpha}\right) \qquad \text{Eq. (I.24)}$$

where j equals 1 for energy level 1 states and 2 for energy level 2 states.

The functions of each term of the equation for $\Gamma_{iOUT}(\alpha)$ are as follows. The first and second terms enforce the normal momentum flux boundary condition to the extent that collisions have been effective in producing a Boltzmann distribution, but include a tangential momentum flux anomaly. The fourth and fifth terms correct for this anomaly, which may arise due to discreteness effects or non-Boltzmann structure due to insufficient collisions. Finally, the third term adds a specified amount of skin fraction to enforce a desired change in tangential momentum flux on the surface. Generation of the friction coefficient $C_f$ is described below. Note that all terms involving vector manipulations are geometric factors that may be calculated prior to beginning the simulation.

From this, a tangential velocity is determined as:

$$u_i(\alpha)=(P(\alpha)-P_n(\alpha)n_\alpha)/\rho, \qquad \text{Eq.(I.25)}$$

where $\rho$ is the density of the facet distribution:

$$\rho = \sum_i N_i(\alpha) \qquad \text{Eq. (I.26)}$$

As before, the difference between the incoming flux distribution and the Boltzmann distribution is determined as:

$$\Delta\Gamma_i(\alpha)=\Gamma_{iIN}(\alpha)-N_{n-\beta i}(\alpha)V_{i\alpha}. \qquad \text{Eq.(I.27)}$$

The outgoing flux distribution then becomes:

$$\Gamma_{iOUT}(\alpha)=N_{n-\beta i}(\alpha)V_{i\alpha}-\Delta\Gamma_{i*}(\alpha)+C_f(n_\alpha c_i)[N_{n-\beta i*}(\alpha)-N_{n-\beta i}(\alpha)]V_{i\alpha}, \qquad \text{Eq.(I.28)}$$

which corresponds to the first two lines of the outgoing flux distribution determined by the previous technique but does not require the correction for anomalous tangential flux.

Using either approach, the resulting flux-distributions satisfy all of the momentum flux conditions, namely:

$$\sum_{i,c_i \cdot n_\alpha > 0} c_i \Gamma_{i\alpha OUT} - \sum_{i,c_i \cdot n_\alpha < 0} c_i \Gamma_{i\alpha IN} = \rho_\alpha n_\alpha A_\alpha - C_i \rho_\alpha u_i A_\alpha \qquad \text{Eq. (I.29)}$$

where $p_\alpha$ is the equilibrium pressure at the facet $F_\alpha$ and is based on the averaged density and temperature values of the voxels that provide particles to the facet, and $u_\alpha$ is the average velocity at the facet.

To ensure that the mass and energy boundary conditions are met, the difference between the input energy and the output energy is measured for each energy level j as:

$$\Delta\Gamma_{\alpha mj} = \sum_{i,c_{ji}\cdot n_\alpha < 0} \Gamma_{\alpha jiIN} - \sum_{i,c_{ji}\cdot n_\alpha > 0} \Gamma_{\alpha jiOUT} \qquad \text{Eq. (I.30)}$$

where the index j denotes the energy of the state i. This energy difference is then used to generate a difference term:

$$\Delta\Gamma_{\alpha ji} = V_{i\alpha}\Delta\Gamma_{\alpha mj'}\sum_{i,c_{ji}\cdot n_\alpha < 0} V_{i\alpha} \qquad \text{Eq. (I.31)}$$

for $c_{ji}n_\alpha>0$. This difference term is used to modify the outgoing flux so that the flux becomes:

$$\Gamma_{\alpha jiOUTf} = \Gamma_{\alpha jiOUT} + \delta\Gamma_{\alpha ji} \qquad \text{Eq. (I.32)}$$

for $c_{ji}n_\alpha>0$. This operation corrects the mass and energy flux while leaving the tangential momentum flux unaltered. This adjustment is small if the flow is approximately uniform in the neighborhood of the facet and near equilibrium. The resulting normal momentum flux, after the adjustment, is slightly altered to a value that is the equilibrium pressure based on the neighborhood mean properties plus a correction due to the non-uniformity or non-equilibrium properties of the neighborhood. If a CFL constraint is violated the process applies 285 the modified flux calculation approach (FIGS. 3-7) to any flux calculations involved in the processes of FIG. 10.

5. Move From Voxels to Voxels

Referring again to FIG. 10, particles are moved between voxels along the three-dimensional rectilinear lattice (step 284). This voxel to voxel movement is the only movement operation performed on voxels that do not interact with the facets (i.e., voxels that are not located near a surface). In typical simulations, voxels that are not located near enough to a surface to interact with the surface constitute a large majority of the voxels.

Each of the separate states represents particles moving along the lattice with integer speeds in each of the three dimensions: x, y, and z. The integer speeds include: 0, ±1, and ±2. The sign of the speed indicates the direction in which a particle is moving along the corresponding axis.

For voxels that do not interact with a surface, the move operation is computationally quite simple. The entire population of a state is moved from its current voxel to its destination voxel during every time increment. At the same time, the particles of the destination voxel are moved from that voxel to their own destination voxels. For example, an energy level 1 particle that is moving in the +1x and +1y direction (1, 0, 0) is moved from its current voxel to one that is +1 over in the x direction and 0 for other direction. The particle ends up at its destination voxel with the same state it had before the move (1,0,0). Interactions within the voxel will likely change the particle count for that state based on local interactions with other particles and surfaces. If not, the particle will continue to move along the lattice at the same speed and direction.

The move operation becomes slightly more complicated for voxels that interact with one or more surfaces. This can result in one or more fractional particles being transferred to a facet. Transfer of such fractional particles to a facet results in fractional particles remaining in the voxels. These fractional particles are transferred to a voxel occupied by the facet.

Figure 16:
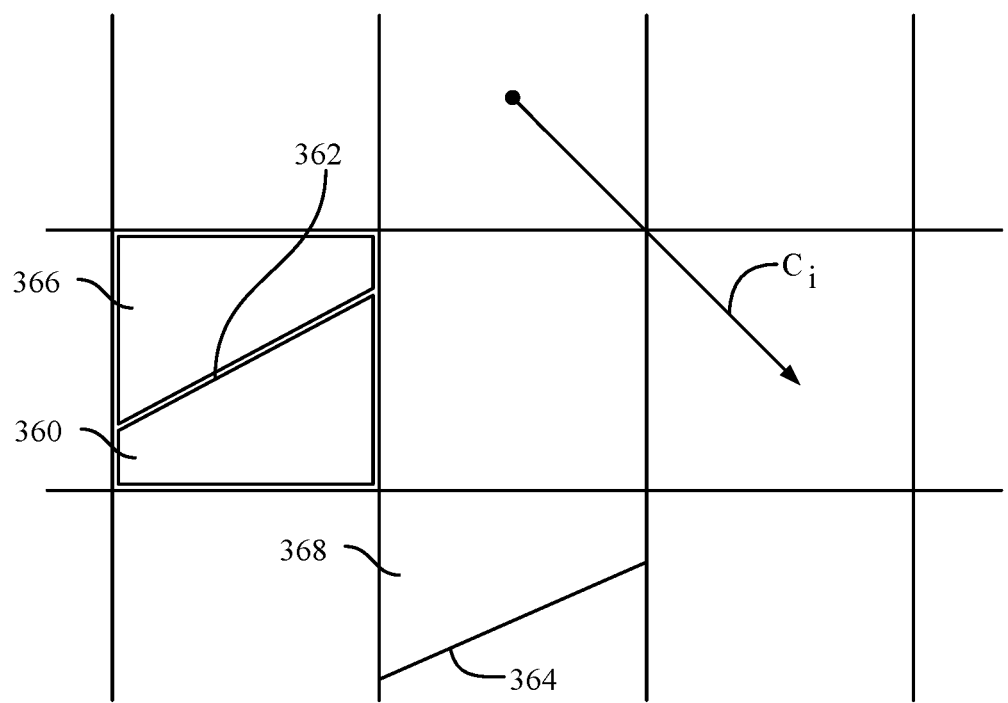
FIG. 16 illustrates regions affected by a facet of a surface (prior art).

Referring to FIG. 16, when a portion 360 of the state i particles for a voxel 362 is moved to a facet 364 (step 278), the remaining portion 366 is moved to a voxel 368 in which the facet 364 is located and from which particles of state i are directed to the facet 364. Thus, if the state population equaled 25 and $V_{i\alpha}(x)$ equaled 0.25 (i.e., a quarter of the voxel intersects the parallelepiped $G_{i\alpha}$), then 6.25 particles would be moved to the facet $F_\alpha$ and 18.75 particles would be moved to the voxel occupied by the facet $F_\alpha$. Because multiple facets could intersect a single voxel, the number of state i particles transferred to a voxel $N(f)$ occupied by one or more facets is:

$$N_i(f) = N_i(x)\left(1 - \sum_\alpha V_{i\alpha}(x)\right) \qquad \text{Eq. (I.33)}$$

where $N(x)$ is the source voxel.

6. Scatter From Facets to Voxels

Next, the outgoing particles from each facet are scattered to the voxels (step 286). Essentially, this step is the reverse of the gather step by which particles were moved from the voxels to the facets. The number of state i particles that move from a facet $F_\alpha$ to a voxel $N(x)$ is:

$$N_{\alpha iF \to V} = \frac{1}{P_f(x)} V_{i\alpha}(x)\Gamma_{\alpha iOUT_f}/V_{\alpha i} \qquad \text{Eq. (I.34)}$$

where $P_f(x)$ accounts for the volume reduction of partial voxels. From this, for each state i, the total number of particles directed from the facets to a voxel $N_{(x)}$ is:

$$N_{iF \to V} = \frac{1}{P_f(x)} \sum_\alpha V_{\alpha i}(x)\Gamma_{\alpha iOUT_f}/V_{\alpha i} \qquad \text{Eq. (I.35)}$$

After scattering particles from the facets to the voxels, combining them with particles that have advected in from surrounding voxels, and integerizing the result, it is possible that certain directions in certain voxels may either underflow (become negative) or overflow (exceed 255 in an eight-bit implementation). This would result in either a gain or loss in mass, momentum and energy after these quantities are truncated to fit in the allowed range of values. To protect against such occurrences, the mass, momentum and energy that are out of bounds are accumulated prior to truncation of the offending state. For the energy to which the state belongs, an amount of mass equal to the value gained (due to underflow) or lost (due to overflow) is added back to randomly (or sequentially) selected states having the same energy and that are not themselves subject to overflow or underflow. The additional momentum resulting from this addition of mass and energy is accumulated and added to the momentum from the truncation. By only adding mass to the same energy states, both mass and energy are corrected when the mass counter reaches zero. Finally, the momentum is corrected using pushing/pulling techniques until the momentum accumulator is returned to zero.

7. Perform Fluid Dynamics

Fluid dynamics are performed (step 288) FIG. 10. This step may be referred to as microdynamics or intravoxel operations. Similarly, the advection procedure may be referred to as intervoxel operations. The microdynamics operations described below may also be used to collide particles at a facet to produce a Boltzmann distribution.

The fluid dynamics is ensured in the lattice Boltzmann equation models by a particular collision operator known as the BGK collision model. This collision model mimics the dynamics of the distribution in a real fluid system. The collision process can be well described by the right-hand side of Equation 1 and Equation 2. After the advection step, the conserved quantities of a fluid system, specifically the density, momentum and the energy are obtained from the distribution function using Equation 3. From these quantities, the equilibrium distribution function, noted by $f^{eq}$ in equation (2), is fully specified by Equation (4). The choice of the velocity vector set $c_i$, the weights, both are listed in Table 1, together with Equation 2 ensures that the macroscopic behavior obeys the correct hydrodynamic equation.

Variable Resolution

Variable resolution (as discussed in US 2013/0151221 A1) can also be employed and would use voxels of different sizes, e.g., coarse voxels and fine voxels.

By leveraging the unique transient Lattice Boltzmann-based physics, the system can perform simulations that accurately predict real-world conditions. For example, engineers evaluate product performance early in the design process before any prototype being built, when the impact of the change is most significant for design and budgets. The system can use the CAD geometry to accurately and efficiently performs aerodynamic, aero-acoustic and thermal management simulations. The system can perform simulations to address such applications as: aerodynamics (aerodynamic efficiency; vehicle handling; soiling and water management; panel deformation; driving dynamics), aeroacoustics (greenhouse wind noise; underbody wind noise; gap/seal noise; mirror, whistle and tonal noise; sunroof and window buffeting; pass-by/community noise; cooling fan noise), thermal management (cooling airflow; thermal protection; brake cooling; drive cycle simulation; key-off and soak; electronics and battery cooling; ROA/intake ports), climate control (cabin comfort; HVAC unit & distribution system performance; HVAC system and fan noise; defrost and demist), powertrain: (drivetrain cooling; exhaust systems; cooling jacket; engine block), soiling and water management (a pillar overflow, dirt and dust accumulation, tire spray).

Embodiments of the subject matter and the functional operations described in this specification can be implemented in digital electronic circuitry, tangibly-embodied computer software or firmware, computer hardware (including the structures disclosed in this specification and their structural equivalents), or in combinations of one or more of them. Embodiments of the subject matter described in this specification can be implemented as one or more computer programs (i.e., one or more modules of computer program instructions encoded on a tangible nontransitory program carrier for execution by, or to control the operation of, data processing apparatus). The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry (e.g., an FPGA (field programmable gate array) or an ASIC (application-specific integrated circuit)). In addition to hardware, the apparatus can optionally include code that produces an execution environment for computer programs (e.g., code that constitutes processor firmware, a protocol stack, a database management system, an operating system, or a combination of one or more of them).

A computer program, which can also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or another unit suitable for use in a computing environment. A computer program may, but need not, correspond to a file in a file system. A program can be stored in a portion of a file that holds other programs or data (e.g., one or more scripts stored in a markup language document, in a single file dedicated to the program in question, or in multiple coordinated files (e.g., files that store one or more modules, subprograms, or portions of code)). A computer program can be deployed so that the program is executed on one computer or on multiple computers that are located at one site or distributed across multiple sites and interconnected by a data communication network.

Computers suitable for the execution of a computer program can be based on general or special purpose microprocessors or both, or any other kind of central processing unit. Computer-readable media suitable for storing computer program instructions and data include all forms of non-volatile memory on media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

Embodiments of the subject matter described in this specification can be implemented in a computing system that includes a back-end component (e.g., as a data server), or that includes a middleware component (e.g., an application server), or that includes a front-end component (e.g., a client computer having a graphical user interface or a web browser through which a user can interact with an implementation of the subject matter described in this specification), or any combination of one or more such back-end, middleware, or front-end components. The components of the system can be interconnected by any form or medium of digital data communication (e.g., a communication network). Examples of communication networks include a local area network (LAN) and a wide area network (WAN) (e.g., the Internet).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user device (e.g., for purposes of displaying data to and receiving user input from a user interacting with the user device), which acts as a client. Data generated at the user device (e.g., a result of the user interaction) can be received from the user device at the server.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing can be advantageous.

What is claimed is:

1. A computer implemented method for simulating a fluid flow about a physical object, the method comprising:
receiving by one or more computing systems, a model of a simulation space including a lattice structure represented as a collection of voxels and a representation of the physical object, with the voxels having resolutions to account for surfaces of the physical object;

simulating, by the one or more computer systems, movement of particles in a volume of fluid, with the movement of the particles causing collisions among the particles;

testing, by the one or more computer systems, a time step value for advection of the particles to subsequent voxels in the collection of voxels;

identifying, by the one or more computing systems, based on the tested time step value, faces between two voxels where at least one of the faces violates a stability condition; for the at least one of the faces that violates the stability condition, computing by the computing system, a modified flux using a spatially averaged gradient in a region containing the two voxels where the at least one of the faces violates the stability condition;

performing by the computing system, advection operations on the particles to subsequent voxels; and storing or displaying by the one or more computer systems results of the simulation.

2. The computer method of claim 1 wherein the computed modified flux is a computed modified heat flux and the spatially averaged gradient is a spatially averaged temperature gradient.

3. The computer method of claim 1 wherein computing the modified heat flux further comprises:
computing by the computing system, an applied flux; and
computing by the computing system, a balance flux.

4. The computer method of claim 3 wherein for a given one of the voxels, the computed applied flux is used to calculate a temperature evolution for the given one of the voxels.

5. The computer method of claim 4 wherein the balance flux is used in the calculation of the temperature evolution depending on the size of the voxel.

6. The computer method of claim 4 wherein the balance flux is used in the temperature evolution when the size of the voxel is large enough so as to satisfy a constraint.

7. The computer method of claim 4 further comprising:
transmitting by the computer system the balance flux to one or more neighboring voxels in a direction of a flux flow.

8. Apparatus for simulating a fluid flow about a physical object, the apparatus comprising:
a memory;
one or more processor devices configured to:
receive a model of a simulation space including a lattice structure represented as a collection of voxels and a representation of the physical object, with the voxels having resolutions to account for surfaces of the physical object;
simulate movement of particles in a volume of fluid through the simulation space, with the movement of the particles causing collisions among the particles;
test a time step value for advection of the particles to subsequent voxels in the collection of voxels;
identify, based on the tested time step value, faces between two voxels where at least one of the faces violates a stability condition; for the at least one of the faces that violates the stability condition,
compute a modified flux using a spatially averaged gradient in a region containing the two voxels where the at least one of the faces violates the stability condition; and
perform advection operations on the particles to subsequent voxels; and
store or display results of the simulation.

9. The apparatus of claim 8 wherein the computed modified flux is a computed modified heat flux, the spatially averaged gradient is a spatially averaged temperature gradient, and the condition includes a stability characteristic.

10. The apparatus of claim 8 wherein the apparatus is further configured to:
compute the modified heat flux by computing an applied flux component and a balance flux component.

11. The apparatus of claim 10 wherein for a given one of the voxels, the computed applied flux is applied to calculate a temperature evolution for the given one of the voxels.

12. The apparatus of claim 10 further configured to:
transmit the balance flux to one or more neighboring voxels in a direction of a flux flow.

13. The apparatus of claim 10 further configured to:
successively transmit the balance flux along the direction of a flux flow until the balance flux is transferred to a large enough voxel where the balance flux is applied towards temperature evolution at that large enough voxel.

14. A computer program product tangible stored on one or more machine-readable hardware storage devices for simulating a fluid flow about a physical object, comprising executable instructions to cause a computer to:
receive a model of a simulation space including a lattice structure represented as a collection of voxels and a representation of the physical object, with the voxels having resolutions to account for surfaces of the physical object;
simulate movement of particles in a volume of fluid through the simulation space, with the movement of the particles causing collisions among the particles;
test a time step value for advection of the particles to subsequent voxels in the collection of voxels;
identify, based on the tested time step value, faces between two voxels where at least one of the faces violates a stability condition; for the at least one of the faces that violates the stability condition,
compute a modified flux using a spatially averaged gradient in a region containing the two voxels where the at least one of the faces violates the stability condition;
perform advection operations on the particles to subsequent voxels; and
store or display results of the simulation.

15. The computer program product of claim 14 wherein the computed modified flux is a computed modified heat flux, the spatially averaged gradient is a spatially averaged temperature gradient, and the condition includes a stability characteristic.

16. The computer program product of claim 14, further comprising instructions to:
compute the modified heat flux by computing an applied flux component and a balance flux component.

17. The computer program product of claim 16 wherein for a given one of the voxels, the computed applied flux is applied to calculate a temperature evolution for the given one of the voxels.

18. The computer program product of claim 17, further comprising instructions to:
transmit the balance flux to one or more neighboring voxels in a direction of a flux flow.

19. The computer program product of claim 17, further comprising instructions to:
successively transmit the balance flux along the direction of the flux until the balance flux is transferred to a large enough voxel where the balance flux is applied towards temperature evolution at that large enough voxel.

20. The computer program product of claim 17 wherein the condition is the Courant-Friedrichs-Lewy (CFL) constraint of a time-marching scheme that determines a largest time-step size that can be used to maintain a stable distribution.

* * * * *